(12) United States Patent
Shang et al.

(10) Patent No.: US 12,229,701 B2
(45) Date of Patent: Feb. 18, 2025

(54) TECHNIQUES FOR COMMUNICATION PROCESS FLOW AND DATA PLATFORM INTEGRATION

(71) Applicant: Salesforce, Inc., San Francisco, CA (US)

(72) Inventors: Tongyun Shang, San Francisco, CA (US); Aaron Popelka, San Francisco, CA (US); William Robert Jennings, II, Indianapolis, IN (US)

(73) Assignee: Salesforce, Inc., San Francisco, CA (US)

( * ) Notice: Subject to any disclaimer, the term of this patent is extended or adjusted under 35 U.S.C. 154(b) by 206 days.

(21) Appl. No.: 17/856,508

(22) Filed: Jul. 1, 2022

(65) Prior Publication Data

US 2024/0005245 A1    Jan. 4, 2024

(51) Int. Cl.
*G06Q 10/0633* (2023.01)
(52) U.S. Cl.
CPC .............................. *G06Q 10/0633* (2013.01)
(58) Field of Classification Search
CPC ......................................... G06Q 10/00–50/00
USPC ................................................ 705/7.11–7.42
See application file for complete search history.

(56) References Cited

U.S. PATENT DOCUMENTS

| | | | | |
|---|---|---|---|---|
| 10,713,251 B2* | 7/2020 | Weissman | ........... | G06F 16/2358 |
| 10,764,233 B1* | 9/2020 | Goldberg | ............ | H04L 51/56 |
| 10,839,466 B2* | 11/2020 | Doyle | .................. | G06Q 50/01 |
| 2006/0277098 A1* | 12/2006 | Chung | ............... | G06Q 30/0267 |
| | | | | 705/14.69 |
| 2008/0140476 A1* | 6/2008 | Anand | ............... | G06Q 30/0276 |
| | | | | 705/14.43 |
| 2012/0079038 A1* | 3/2012 | Hersh | .................. | H04L 67/306 |
| | | | | 709/206 |
| 2015/0025977 A1* | 1/2015 | Doyle | ................ | G06Q 30/0269 |
| | | | | 705/14.66 |
| 2016/0078091 A1* | 3/2016 | Weissman | ......... | G06F 16/24575 |
| | | | | 707/722 |
| 2016/0103585 A1* | 4/2016 | Varadharajan | ......... | G06Q 10/10 |
| | | | | 715/810 |
| 2018/0204217 A1* | 7/2018 | Bedi | .................. | G06Q 20/4016 |
| 2020/0097482 A1* | 3/2020 | Woodward | .......... | G06F 16/2322 |
| 2020/0126100 A1* | 4/2020 | Goyal | .................. | H04N 21/812 |
| 2020/0133821 A1* | 4/2020 | Agrawal | ............... | G06F 21/606 |
| 2020/0394225 A1* | 12/2020 | Nair | ....................... | G06N 20/00 |
| 2021/0073187 A1* | 3/2021 | Castano | ................ | G06F 16/254 |

(Continued)

*Primary Examiner* — Alan S Miller
(74) *Attorney, Agent, or Firm* — Holland & Hart LLP

(57) ABSTRACT

Methods, systems, apparatuses, devices, and computer program products are described. A communication process flow management service that manages a communication process flow may receive an indication of a segment of entities from a second service that manages a data model for multiple entities. Based on an action of the communication process flow, the communication process flow management service may request schema of the data model or additional attribute data associated with the segment from the second service. The communication process flow management service may receive the schema or the additional attribute data and use it to determine a set of communications to be transmitted to one or more entities of the segment. The communication process flow management service may transmit the set of communications in accordance with the communication process flow.

20 Claims, 11 Drawing Sheets

(56) References Cited

U.S. PATENT DOCUMENTS

| | | | |
|---|---|---|---|
| 2021/0150551 A1* | 5/2021 | Nair | G06F 21/6245 |
| 2021/0158398 A1* | 5/2021 | Merrill | G06Q 30/0277 |
| 2021/0173633 A1* | 6/2021 | Criscuolo | G06F 8/656 |
| 2021/0209699 A1* | 7/2021 | Doyle | G06Q 30/0269 |
| 2022/0293107 A1* | 9/2022 | Leaman | G06F 16/951 |

* cited by examiner

TECHNIQUES FOR COMMUNICATION PROCESS FLOW AND DATA PLATFORM INTEGRATION

FIELD OF TECHNOLOGY

The present disclosure relates generally to database systems and data processing, and more specifically to techniques for communication process flow and data platform integration.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support systems that are used to create, manage, and update communication process flows. For example, a communication process flow management service may be used to design and implement a communication process flow that controls communications between a tenant and a set of users or entities (e.g., subscribers). In addition, a separate service may support segmentation of entities based on attributes associated with the entities. This data may be available for use in communication process flows in a static manner. However, the data may be updated based on past user behavior instead of recent user behavior, which may result in the communication process flow lacking the ability to leverage a data model of the separate service for enhanced functionality.

DETAILED DESCRIPTION

Figure 1:
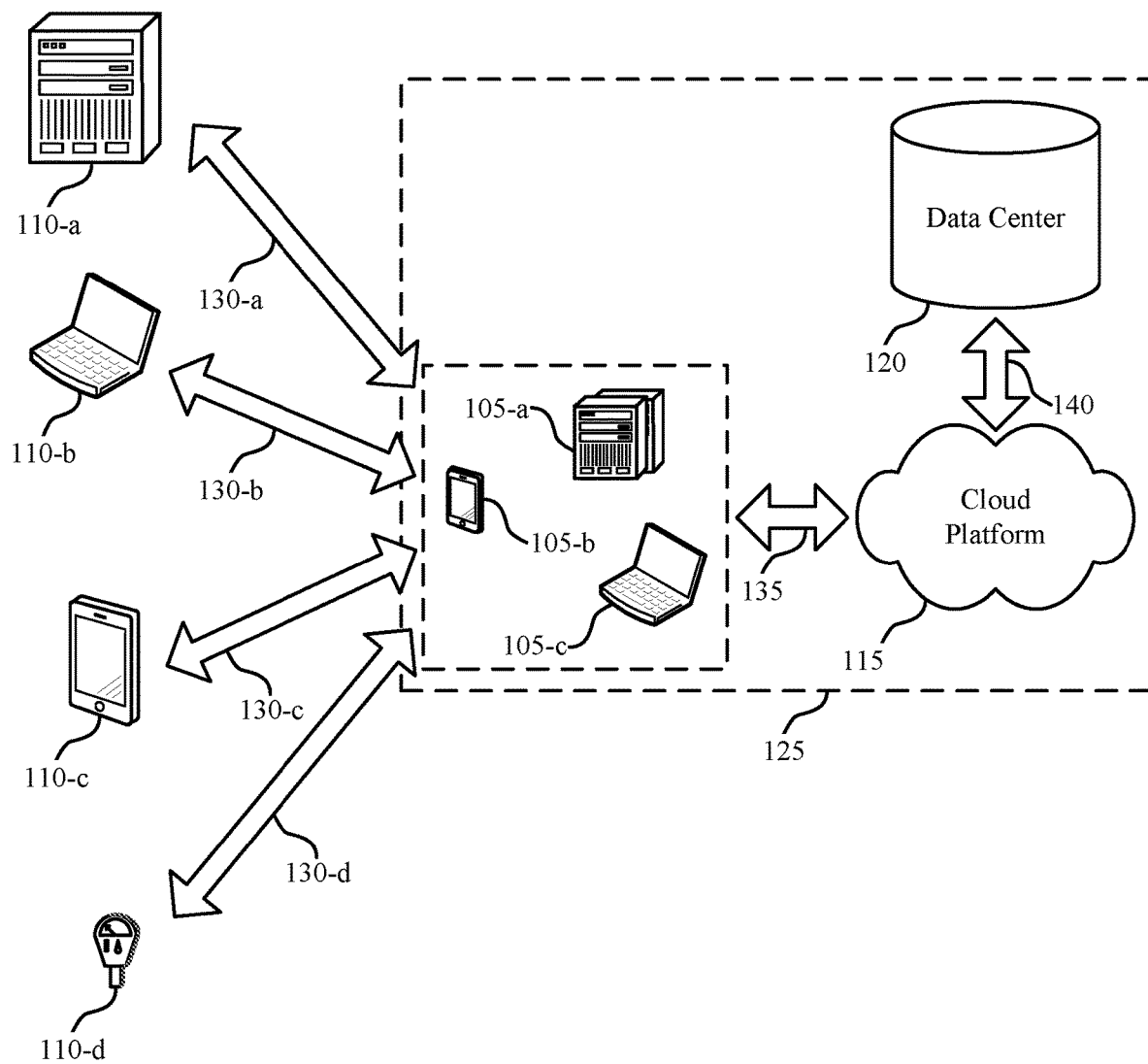
FIG. 1 illustrates an example of a data processing system that supports techniques for communication process flow and data platform integration in accordance with aspects of the present disclosure.

A communication process flow management service may support creation, configuration, management, and deployment of a communication process flow (sometimes referred to as a "journey") that manages communications between a tenant or organization and a set of users. For example, an organization or tenant may use the communication process flow management service to schedule and manage communications between the organization and the set of users, which may be examples of subscribers, customers, or prospective customers of the organization. Users may receive electronic communications (e.g., emails, messages, advertisements, marketing campaigns) according to a communication process flow. The communication process flow may include various actions and message configurations, and transmission of various communications may depend on user attributes and user web behavior, among other parameters.

A data platform (e.g., customer data platform (CDP)) may support segmentation of entities (corresponding to users) based on attributes (e.g., age, gender, purchase history) associated with the entities, where the attributes may be identified by ingesting data from multiple data sources. Administrative users or employees associated with the tenant (e.g., a marketing team) may manually or automatically adjust aspects of the communication process flow for communication management, for example, using the data from the data platform. Data from the data platform may be available for use in communication process flows in a static, unidirectional manner (e.g., the data may be pushed one time from the data platform to the communication process flow management service). For example, a segment of entities may be generated at the data platform, and the segment and some associated data may be pushed to the communication process flow management service. However, the one-time data transfer from the data platform to the communication process flow management service may limit the effectiveness and accuracy of communication process flows.

Techniques described herein support integration of a communication process flow management service and a data platform (e.g., CDP), which may enable the communication process flow management service to receive real-time data and data models from the data platform. As such, two-way (e.g., push and pull) communications may be supported between the communication process flow management service and the data platform. In some examples, application programming interface (API) calls may be made directly to a schema of the data model of the data platform to retrieve attributes associated with entities depending on different activities of the communication process flow. That is, the communication process flow management service may request a schema of a data model or additional attribute data from the data platform based on different activities or actions (e.g., decision splits, wait until events) of the communication process flow. The data platform may transmit the schema of the data model or the additional data attribute such that the communication process flow management service may determine a set of communications to be transmitted to one or more entities. As such, the set of communications may be transmitted to the one or more entities in accordance with a communication process flow. For example, entities may be routed down a particular path of the communication process flow and receive one or more corresponding email communications.

Additionally, when a user configures or updates the communication process flow, the communication process flow management service may query the data platform for the schema of the data model, the attribute data, or both, which the communication process flow management service may use to inform an expression that defines an activity of the communication process flow (e.g., a decision split). As such, users may have increased flexibility to select different attributes for different activities and configure them for the communication process flow in any order based on an updated schema, attribute data, or both. In addition, users may define exit criteria for a communication process flow based on attributes stored in the data platform such that entities may not be released from (e.g., routed out of) the communication process flow unexpectedly or sent communications that are no longer relevant. As such, integration of the communication process flow management service and the data platform may support enhanced functionality for communication process flow configuration and execution.

Aspects of the disclosure are initially described in the context of an environment supporting an on-demand database service. Aspects of the disclosure are then describes in the context of computing architectures and process flows. Aspects of the disclosure are further illustrated by and described with reference to apparatus diagrams, system diagrams, and flowcharts that relate to techniques for communication process flow and data platform integration.

FIG. 1 illustrates an example of a data processing system 100 for cloud computing that supports techniques for communication process flow and data platform integration in accordance with various aspects of the present disclosure. The data processing system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to particular applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with interactions 130 between contacts from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

One or both of the cloud platform 115 or the subsystem 125 may support a communication process flow management service, which may be used to configure a communication process flow (e.g., journey). As described herein, a communication process flow may control electronic communications (e.g., emails, messages, push messages, advertisements) between a tenant (e.g., a cloud client 105) of a multi-tenant system and a set of users (e.g., contacts 110) associated with the tenant. The communication process flow may include various actions that are used to manage these electronic communications. For example, the communication process flow may include email or message send actions, decision splits, wait periods, and the like. In addition, the communication process flow may include different routes (e.g., sets of actions) that are configured via the communication process flow management service. Whether a user receives messages via a specific route may depend on attributes or behaviors of a user (e.g., interests, activity patterns, demographic information, web behaviors). These attributes may be stored in association with user identifiers (e.g., entity identifiers) at the data center 120, which may be separate from the communication process flow management service.

In some systems, a data platform may support segmentation (e.g., categorization) of users based on attribute data stored in the data platform, where the attributes may be identified by ingesting data from multiple data sources. A segment of users may be indicated to the communication process flow management services for communications. Data from the data platform may be available for use in communication process flows in a static, unidirectional manner (e.g., the data may be pushed one time from the data platform to the communication process flow management service). For example, a segment of entities may be generated at the data platform, and the segment and some associated data may be pushed to the communication process flow management service. Communication process flows may be configured by teams of administrators or users associated with the tenant (e.g., employees of an organization corresponding to the tenant). For example, these users may perform various activities related to configuring, reviewing, activating, and monitoring communication process flows using the communication process flow management service. However, as the data at the data platform may be static, the data platform data model and attribute data may not be usable for communication process flow configuration and execution.

More particularly, because there may be a one-time transmission of data from the data platform to the communication process flow management service, the transmitted data may be past user behavior (e.g., instead of real-time, recent user behavior), which may result in reduced effectiveness of a communication process flow or unwarranted user behaviors. In addition, while the communication process flow may be configured using data from a contacts model (e.g., user profile data stored at the communication process flow management service), the contacts model may be expensive to build and upkeep, and may incur processor and resource overhead due to slow read times.

Additionally, as the administrative users or employees associated with the tenant select an entry source object received from the data platform and including a schema of a data model that may be applied to an entire communication process flow, the communication process flow may be unable to leverage the data model of the data for enhanced functionality. Additionally, entities may be removed from a segment of entities associated with the communication process flow unexpectedly, for example, based on some attribute data changing. Because of such limited integration between the communication process flow management service and the data platform, users associated with the tenant may lack insight into the data platform and the attribute data the communication process flow is configured for (e.g., the users may lack insight into how large a next payload may be, what attribute data may be included in a segment, when the attribute data was last updated, and the like). In addition, making attribute data from the data platform available for the communication process flow in a static manner may result in workflow inefficiencies and reduced functionality of communication process flows.

Techniques described herein and supported by the data processing system 100 provide for integration of a communication process flow management service and a data platform (e.g., CDP). For example, the described techniques may enable a communication process flow management service to receive real-time data and data models from the data platform, and as such, there may be two-way (e.g., push and pull) communications between the communication process flow management service (e.g., supported by the cloud platform 115) and the data platform (e.g., supported by the data center 120). In some examples, the communication process flow management service may receive, from the data platform which manages a data model for a set of multiple entities, an indication of a segment of entities of the set of multiple entities. The segment of entities may be associated with one or more attributes (e.g., age, gender, purchase history), and configured to receive communications in accordance with a communication process flow. That is, the segment of entities may be entered into the communication process flow.

The communication process flow management service may transmit a request to the data platform based on an action (e.g., a decision split) of the communication process flow. The request may be for a schema of the data model or for additional attribute data associated with the segment of entities. The data platform may transmit the schema of the data model or the additional attribute data, which the communication process flow management service may use to determine communications (e.g., emails or other electronic communications) to be transmitted to the segment of entities. The communications may be transmitted to the segment of entities in accordance with the communication process flow.

In some examples, the segment of entities may include users (e.g., customers, subscribers) subscribed to a website associated with a tenant. The segment of entities may be associated with attributes such as first name and last name, purchase history, and rewards status, among other attributes. A user of a tenant or organization supporting the website (e.g., a marketer) may configure a decision split in a communication process flow, which may trigger the communication process flow management service to send an email to entities that are enrolled in a loyalty program, for example. Based on filter criteria associated with the decision split, the communication process flow management service may transmit a request to the data platform for a schema of the data model or for additional attribute data associated with the segment of entities. The additional attribute data may indicate the most recent data identifying customers enrolled in the loyalty program. As such, customers that are enrolled in the loyalty program may receive the email in accordance with the communication process flow, while customers unenrolled in the loyalty program (e.g., whether because they were unenrolled from the beginning of the communication process flow, had recently canceled enrollment, or the like) may be routed via a different path of the communication process flow and receive a different set of communications.

Integrating the communication process flow management service and the data platform may support improved workflow efficiencies, improved communication process flow configurations, and increased customer satisfaction, among other benefits. For example, the described techniques may enable the communication process flow management service to make API calls to the data platform for data defined in different activities of a communication process flow, which may improve the effectiveness of the communication process flow by ensuring customers are routed and receive communications accurately. In addition, the described techniques enable the communication process flow management service to request updated data from the data platform at runtime, the communication process flow may use the most recent data, thus improving workflow efficiencies and increased customer satisfaction as customers may receive intended communications and/or be released from the communication process flow according to expected communication process flow behavior.

It should be appreciated by a person skilled in the art that one or more aspects of the disclosure may be implemented in a data processing system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
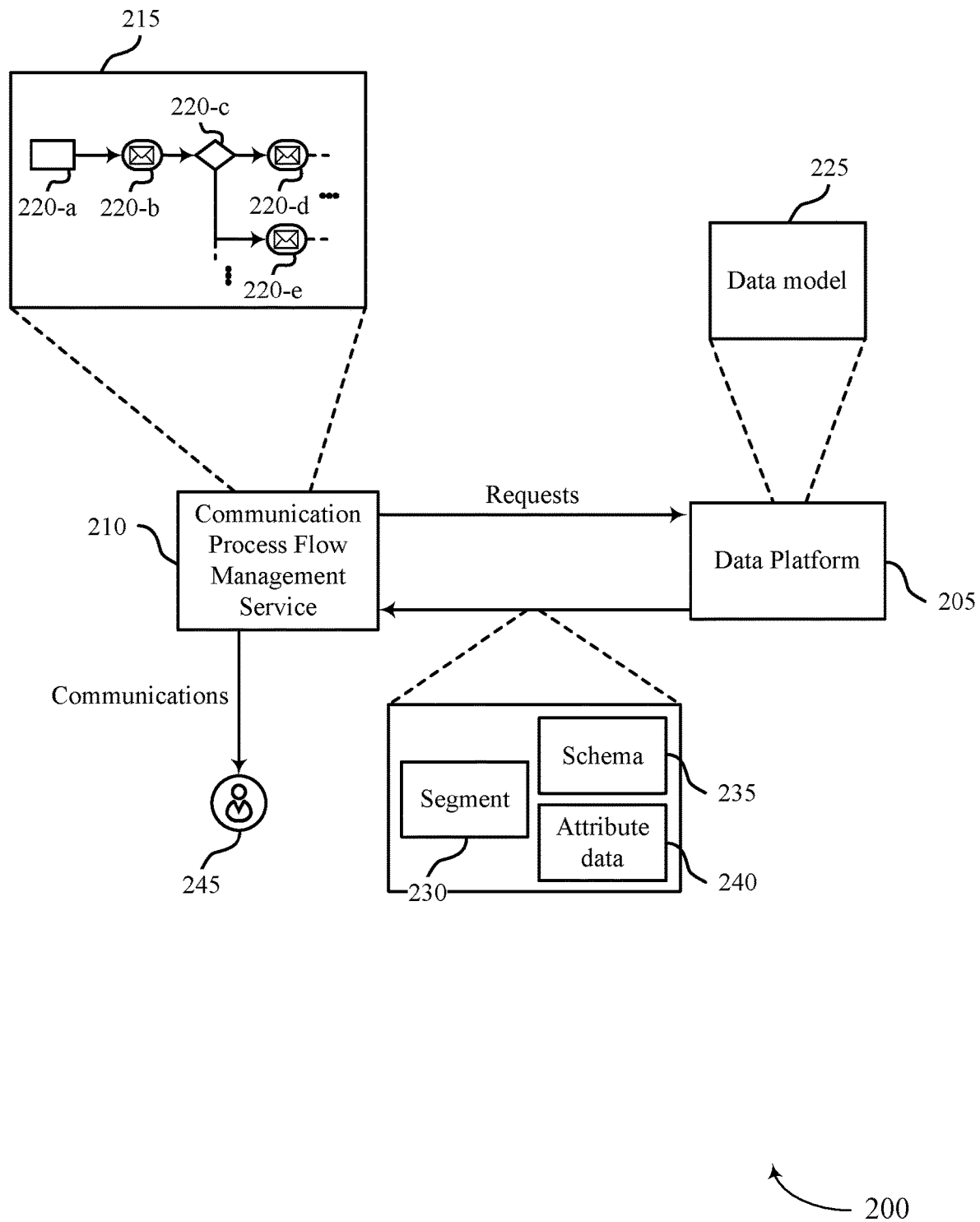
FIGS. 2 and 3 illustrate examples of computing architectures that support techniques for communication process flow and data platform integration in accordance with aspects of the present disclosure.

FIG. 2 illustrates an example of a computing architecture 200 that supports techniques for communication process flow and data platform integration in accordance with aspects of the present disclosure. The computing architecture 200 may implement or be implemented by aspects of the data processing system 100. For example, the computing architecture 200 may include a data platform 205 and a communication process flow management service 210, each of which may be implemented by aspects of a cloud platform 115 and/or a subsystem 125 described with reference to FIG. 1. In some examples, the systems or servers supporting the data platform 205 may include computing systems that are logically or physically separated from systems or servers supporting the communication process flow management service 210.

As described herein, the communication process flow management service 210 may support creation, configuration, and implementation of various communication process flows (e.g., a communication process flow 215) that control electronic communications between a tenant and a set of users associated with the tenant. For example, users associated with the tenant may use the communication process flow management service 210 to configure actions (e.g., actions 220) that include processor-executable instructions for management of electronic communications. For example, an action 220-a may include instructions that, when executed by a processor, selects users (e.g., customers) for the communication process flow 215. That is, the action 220-a may define a rule for determining whether users are to receive electronic communications in accordance with the communication process flow 215 (e.g., an event entry). The rule may be based on various attributes and behaviors (e.g., demographic information, web activity patterns, purchase history) of the users. For example, users that have purchased a product from the tenant (or an organization associated with the tenant) in the last six months may receive electronic communications from the tenant in accordance with the communication process flow 215. Users that do not satisfy this criteria may not receive electronic communications in accordance with the communication process flow 215.

Other actions 220 may define message transmission schemes, decision splits, and other related processes. For example, each user that satisfies a rule defined by the action 220-a may receive an email according to an action 220-b. The action 220-b may include specific content that is to be transmitted to the users (e.g., via email). Similarly, an action 220-c may define a decision split between users. For example, users that have opened an email corresponding to the action 220-b may be routed to an action 220-d, while users that have not opened the email corresponding to the action 220-b may be routed to an action 220-e. Additionally, or alternatively, the action 220-c (e.g., a decision split) may utilize other attributes and behaviors to route users through the communication process flow 215.

The data platform 205 may support segmentation of entities (e.g., an entity 245) based on attributes associated with the entities, where the attributes may be identified by ingesting data from multiple data sources such as email records, mobile application data, geolocation data, and website activity, profile data, among other data sources. In addition, the data platform 205 may support a data model 225, which may enable the data from the multiple data sources to be segmented and analyzed. Users of a tenant or an organization (e.g., a marketing team) may store large amounts of records and user profiles in the data platform 205. A schema 235 of the data model 225 (e.g., a Cloud Information Model (CIM)) and attribute data stored at the data platform 205 may be available for use in the communication process flow 215. For example, a user of the tenant may use the schema 235 of the data model 225 or the attribute data to configure actions 220 of the communication process flow 215 and route users (e.g., customers, subscribers) via a particular path of the communication process flow. The schema 235 may define one or more tables corresponding to data objects and columns of the tables (e.g., fields of the data object). The schema 235 may also define relationships between tables and/or fields of tables. Attribute data may be values corresponding to fields (e.g., values in a column or row of a table). There are direct relationships between attributes (e.g., one-to-one relationships), such as a first name (e.g., a user has only one first name). There may also be indirect or one-to-many relationships between attributes (e.g., a user may have multiple purchased products associated with it). The schema 235 may define whether an attribute is a direct or indirect attribute. As described herein, based on the schema 235, an expression of an action 220 may be defined. Thus, the schema 235 may be requested for and received based on an action configuration.

The computing architecture 200 may support integration of the data platform 205 and the communication process flow management service 210, which may enable the communication process flow management service 210 to receive real-time data and data model schemas from the data platform 205. A user of the tenant may use the communication process flow management service 210 create, manage, and update the communication process flow 215. For example, a user may begin a communication process flow 215, configure an action 220 such as a decision split or a wait until event activity, configure an entry source, configure a schedule, configure exit criteria, or any combination thereof. In addition, the user may update or configure additional actions 220 or features of the communication process flow 215. The user may configure these actions 220 or other features of the communication process flow 215 in any order (e.g., at any time). For example, the user may configure the exit criteria before a decision split for the communication process flow 215. That is, because of the real-time, two-way communications between the communication process flow management service 210 and the data platform 205, the communication process flow management service 210 may transmit a request to the data platform 205 for a schema 235 of the data model 225 or additional attribute data 240. Transmitting this request at any point (e.g., during communication process flow 215 configuration or execution), the user may use the schema 235 of the data model 225 or the additional attribute data 240 to configure an action 220 or a feature of the communication process flow 215.

In some cases, a user may select a data source for use in configuring and executing the communication process flow 215. Instead of selecting contact data (e.g., contacts, user profile data) stored at the communication process flow management service 210, the user may select to use a particular audience or preconfigured segment (and corresponding attribute data, a corresponding schema of the data model 225, or both) from the data platform 205. In some examples, the communication process flow management service 210 may operate on a first cloud platform (e.g., a marketing cloud), and the data platform 205 may operate on a second cloud platform (e.g., a core platform) separate from the first cloud platform. As such, the communication process flow management service 210 and the data platform 205 may communicate across cloud platforms.

The audience selected from the communication process flow 215 may include one or more segments of entities 230 stored in the data platform 205, and may be associated with an entry source of the communication process flow 215 (e.g., an audience entry). That is, the segment of entities 230 may correspond to customers or subscribers of an organization or tenant managing the communication process flow management service 210. In some examples, the communication process flow management service 210 may receive an indication of a segment of entities 230 from the data platform 205. The segment of entities 230, which may include the entity 245 (e.g., a customer), may be associated with one or more attributes and configured to receive a set of communications in accordance with the communication process flow 215. For example, the segment of entities 230 may be associated with attributes such as first name, last name, age, gender, and purchase history, residence, and the set of communications may be associated with a marketing campaign for an online store (e.g., a set of emails). In addition, the audience may be associated with a set of audience schema fields that identify names of the one or more attributes. For example, an audience may include entities that have an abandoned cart on a website, an unused promotional coupon, who are new or existing members of a loyalty program, among other examples. In some cases, the quantities of entities and the attributes associated with the segment of entities 230 may change as users are routed through the communication process flow.

In some cases, based on an action 220 of the communication process flow 215, the communication process flow management service 210 may transmit a request to the data platform 205 for the schema 235 of the data model 225 (e.g., CIM) or the additional attribute data 240 associated with the segment of entities 230. For example, a user of the tenant may configure the action 220-c that defines a decision split between entities of the segment of entities. A decision split may route entities via different paths of the communication process flow 215 using filter criteria that is based on one or more attributes associated with the entities. Accordingly, the communication process flow management service 210 may request the schema 235 of the data model 225 or the additional attribute data 240 to support configuration of which entities are routed via which path of the communication process flow 215.

In some examples, the communication process flow management service 210 may transmit the request for the additional attribute data 240 associated with the segment of entities based on executing the action of the communication process flow. For example, the communication process flow management service 210 may transmit the request for refreshed (e.g., most recent) data from the data platform 205 based on the action being configured and/or executed. For example, the action 220-c may be a decision split that is based on a purchase history. More particularly, if a user/entity has purchased a product in the last year, then the user is routed to action 220-d, and if a user/entity has not purchased a product in the last year, then the user is routed to action 220-e, based on the action 220-c. Before the action 220-c is executed, the techniques described herein support the communication process flow management service 210 generating and executing a request or query to the data platform 205 for identification of updated attribute data 240 associated with entities such that users/entities are routed correctly. As such, when a user first enters the communication process flow 215, the user may not have purchased an item, but upon execution of action 220-c, the user may have purchased the item. The updated data identified using the techniques described herein support routing such a user correctly.

The communication process flow management service 210 may receive the schema 235 of the data model 225 or the additional attribute data 240 from the data platform 205. Using the schema 235 or the additional attribute data 240, the communication process flow management service 210 may determine a set of communications (e.g., emails or other electronic communications) to be transmitted to one or more entities of the segment of entities 230. In some examples, based on requesting the schema 235 or the additional attribute data 240 for the decision split (e.g., the action 220-c), the communication process flow management service 210 may route some entities via a first path of the communication process flow 215 and some other entities via a different path of the communication process flow 215. For example, the communication process flow management service 210 may receive the schema 235 from the data platform 205 that indicates which entities of the segment of entities 230 are associated with a "VIP" attribute. Entities associated with the VIP attribute (e.g., VIP customers) may be routed to the action 220-d, and the communication process flow management service 210 may transmit a particular set of communications (e.g., a coupon email) to those customers. Entities associated with a different customer status (e.g., not VIP customers) may be routed to a different action 220 of the communication process flow 215 and may receive a different set of communications, or may fail to receive any communications at this point in the communication process flow 215. As such, instead of the communication process flow management service 210 making one API call to the data platform 205 or receiving the entity data via a push transmission at the beginning of the communication process flow 215 and having a fixed audience with fixed data, the communication process flow management service 210 may transmit requests to the data platform 205 for the schema 235 of the data model 225 or the attribute data 240 for use in different actions 220 of the communication process flow 215.

In some cases, the communication process flow management service 210 may transmit the request for the schema 235 of the data model 225 based on a user of the tenant actively configuring the communication process flow 215 using the communication process flow management service 210. For example, the communication process flow management service 210 may receive an input from the user to configure an action 220 or other activity of the communication process flow 215. The user may use the schema 235 to inform the configuration of the action 220, such as filter criteria for a decision split. In some examples, the filter criteria may be included in an expression used for routing an entity via a path of the communication process flow 215. For example, after receiving the schema 235 from the data platform 205, the communication process flow management service 210 may determine the expression for routing the entity via the path of the communication process flow 215 based on the schema 235. The expression may indicate which attributes may trigger different entities of the segment of entities 230 to be routed via multiple paths of the communication process flow 215. Additionally, or alternatively, as the user is configuring the action, the communication process flow management service 210 requests the schema 235 of the data model such that attributes or fields are displayed for selection by a user for defining the filter criteria (e.g., expression). More particularly, navigates a user interface supported by the communication process flow management service 210, the user interface may display attributes/files of the schema 235 of the data model 225 based on the user navigation.

A user may configure an action 220 for the communication process flow 215 such as a wait until event. For example, if a set of communications (e.g., an email, an SMS message) is already configured, the user may select an event that may trigger an entity to be routed via a particular path of the communication process flow 215. An event may include installation of an application, the application being opened, and the like. After occurrence of the event, the communication process flow management service 210 may transmit the request to the data platform 205 for additional attribute data 240, which may be used to route different entities. In some examples, the request may identify one or more fields associated with the additional attribute data 240, such as a universally unique ID (UUID), a session ID, a name, and a product ID, among other fields. That is, the communication process flow management service 210 may call to the data platform 205 for a specific data table (e.g., specific schema fields having specific field names) instead of for the entire schema 235 of the data model 225. The communication process flow management service 210 may receive the additional attribute data 240 from the data platform 205 based on the additional attribute data 240 and corresponding fields that were requested.

In addition, the communication process flow management service 210 may define a filter for the entities using the additional attribute data 240 and the fields, and may route the entities based on the filter. For example, if an entity updates an application (e.g., an event), the entity may be filtered and routed via a path of the communication process flow 215 such that a customer may receive a push notification for a coupon next time the customer logs into the application. Routing the entity in this way may be based on a filter criteria that is based on one or more fields such as a session ID, or a field specifying whether the application was updated. In addition, a maximum wait duration may be configured for a wait until activity, which may define a time period after the event occurs and before routing an entity via a configured path of the communication process flow 215.

The information associated with the segment of entities 230 (e.g., a quantity of entities, attributes, schema field names) may change as users (e.g., customers) are routed through the communication process flow 215. For example, a first name field associated with an entity may change, or a customer may unsubscribe from an email list. As such, the communication process flow management service 210 may call the data platform 205 for refreshed, recently published data before runtime to ensure that the communication process flow 215 is configured using the most up-to-date information that may be available. The communication process flow management service 210 may transmit a request to the data platform 205 for an updated schema 235 of the data model 225 or updated additional attribute data 240. The communication process flow management service 210 may transmit the request based on an action 220 of the communication process flow 215. For example, if the communication process flow management service 210 is to transmit a set of communications (e.g., an email) to the entity 245 at midnight, the communication process flow management service 210 may transmit the updated schema 235 or the updated additional attribute data 240 to the data platform 205 at 11:55 pm (e.g., five minutes before the set of communications is to be transmitted). Accordingly, the communication process flow management service 210 may transmit the set of communications using updated user-data, instead of based on the original segment of entities 230 (e.g., audience) received from the data platform 205 and selected as the entry source of the communication process flow 215.

In some examples, because of the two-way communication between the communication process flow management service 210 and the data platform 205, the communication process flow management service 210 may request or automatically receive the updated information from the data platform 205. For example, if the data platform automatically updates the schema 235 or the additional attribute data 240 associated with the segment of entities 230, the communication process flow management service 210 may receive a push from the data platform 205 querying whether the communication process flow management service 210 may accept or ignore the updated information. Alternatively, the communication process flow management service 210 may manually transmit the request to the data platform 205 for the updated schema 235 or the updated additional attribute data 240. In some cases, the request may be configured such that the communication process flow management service 210 may automatically transmit the request for the updated information at particular times (e.g., a recurring schedule).

To prevent entities from being released or exited from the communication process flow 215 unexpectedly, a user may configure exit criteria for the communication process flow 215 using the communication process flow management service 210. The user may select attributes associated with the segment of entities 230 and stored in the data platform 205 that may define when entities may exit the communication process flow 215. For example, if an entity has reached a VIP-level status of a loyalty program, the entity may be exited from the communication process flow 215 and routed via a path that may be specific to VIP customers.

The communication process flow management service 210 may configure and implement the exit criteria based on the schema 235 and the additional attribute data 240 requested from the data platform 205, and may release (e.g., exit) a customer from the communication process flow 215 accordingly. For example, the communication process flow management service 210 may determine that an exit criteria defined by the communication process flow is satisfied by the additional attribute data 240 that is associated with an entity of the segment of entities 230 and received in response to the request. Accordingly, the communication process flow management service 210 may remove the entity from the segment of entities 230 in association with the communication process flow (e.g., remove a corresponding customer from the communication process flow 215) based on the exit criteria being satisfied by the additional attribute data 240.

In some examples, the communication process flow management service 210 may be configured to evaluate the exit criteria and the most recent attribute data associated with the segment of entities 230 before a next activity or action 220 of the communication process flow 215. That is, the communication process flow management service 210 may query specific attribute data from the data platform 205 rather than an overall refresh of the schema 235 of the data model 225. If the attribute data satisfies the exit criteria for a given entity (e.g., if the entity recently became a VIP member), then the entity may be removed from the communication process flow 215. Using real-time attribute data to inform the exit criteria in this way may prevent users from being unexpectedly released from the communication process flow 215, and may ensure that entities that are correctly on a path of the communication process flow 215 are receiving the correct set of communications. That is, entities may remain in the communication process flow 215 unless a specific attribute associated with the exit criteria changed such that the exit criteria are no longer satisfied. Other techniques for integrating the communication process flow management service 210 and the data platform 205 are contemplated within the scope of the present disclosure.

Figure 3:
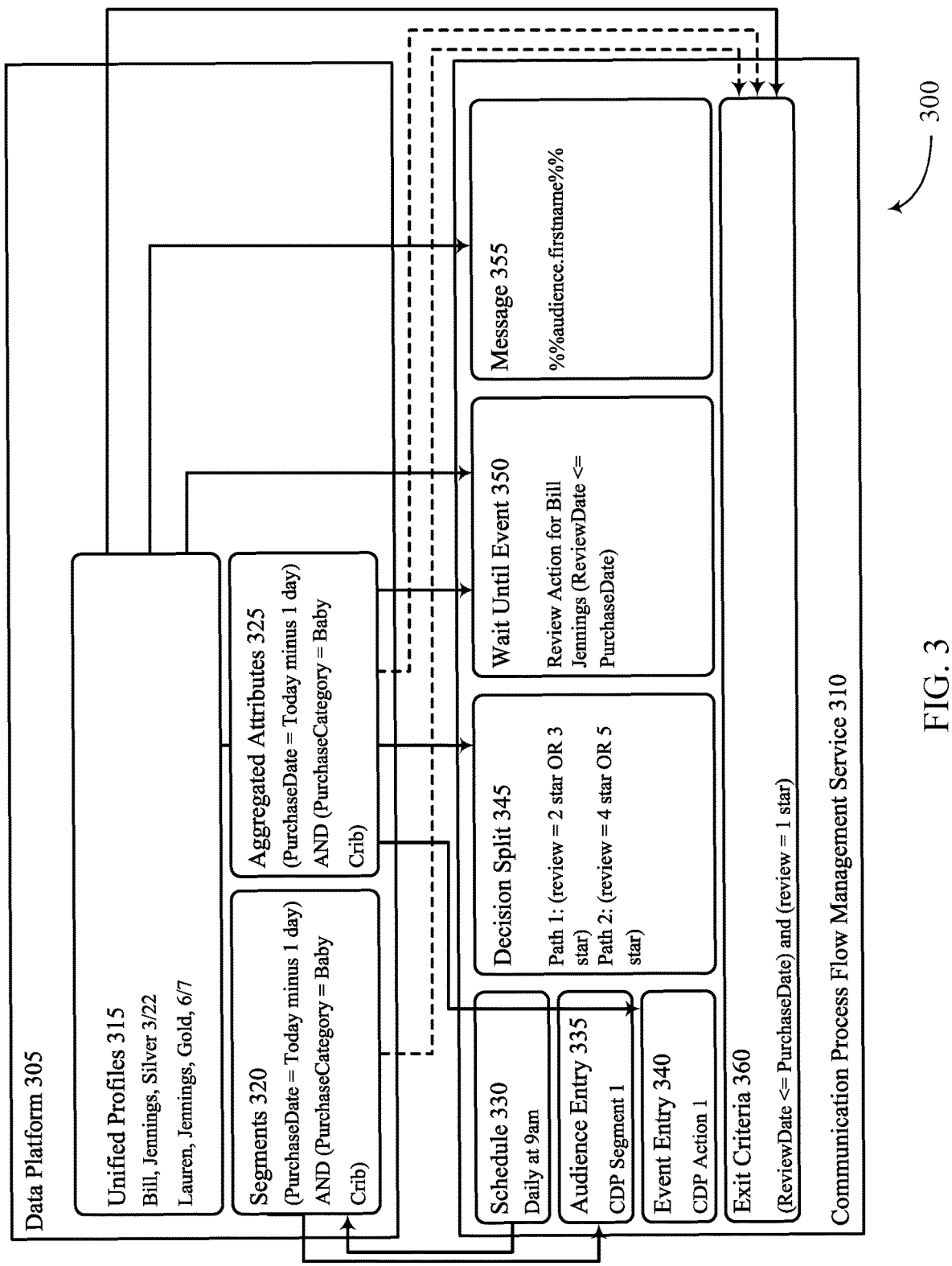

FIG. 3 illustrates an example of a computing architecture 300 that supports techniques for communication process flow and data platform integration in accordance with aspects of the present disclosure. The computing architecture 300 may implement or be implemented by aspects of the data processing system 100 or the computing architecture 200. For example, the computing architecture 300 may include a data platform 305 (e.g., a CDP) and a communication process flow management service 310, each of which may be implemented by aspects of a cloud platform 115 and/or a subsystem 125 described with reference to FIG. 1. In some examples, the systems or servers supporting the data platform 305 may include computing systems that are logically or physically separated from systems or servers supporting the communication process flow management service 310. For example, the communication process flow management service 310 may operate on a first cloud platform and the data platform 305 may operate on a second cloud platform.

The computing architecture 300 may support integration between the data platform 305 and the communication process flow management service 310, which may improve efficiency and effectiveness of a communication process flow managed by the communication process flow management service 310. The data platform 305 may support segmentation of entities based on attributes (e.g., age, gender, purchase history) associated with the attributes, and the attributes may be identified by ingesting data from multiple data sources. For example, the data platform 305 may support unified profiles 315, segments 320, and aggregated attributes 325.

The unified profiles 315 may include data combined from the multiple data sources into a single profile based on a set of rules defined by a user of the data platform 305. As such, the unified profiles 315 may include information that identifies entities (e.g., customers) associated with the data from the multiple data sources (e.g., customer profile data). The unified profiles 315 may be used to create targeted audience segments, such as the segments 320.

The segments 320 may include a segment of entities 230 as described with reference to FIG. 2. A user may define the segments 320 to break down data in the data platform 305 and more efficiently target specific groups of customers. The segments 320 may be based on any entities from a data model of the data platform (e.g., a data model object to which users may write segments 320 and attributes associated with the segments 320). In some cases, the segments 320 may include a segment of entities associated with one or more attributes, such as name, age, and purchase history. In the example of FIG. 3, the segments 320 may be defined based on a purchase date (e.g., today minus 1 day) and a purchase category (e.g., baby crib), such that the entities in the segments 320 may each be associated with the defined purchase date and purchase category. In addition, the segments 320 may correspond to an audience for a communication process flow managed by the communication process flow management service 310 (e.g., an entry source for the communication process flow). That is, the segments 320 may be activated to the communication process flow such as to receive a set of communications (e.g., emails) in accordance with the communication process flow.

The aggregated attributes 325 may identify one or more attributes that correspond to one or more actions (e.g., events) performed by entities included in the segments 320. As such, the aggregated attributes 325 may correspond to the one or more attributes associated with the segments 320. For example, an action may be the purchase of a baby crib, and may be associated with aggregated attributes 325 such as a purchase date (e.g., today minus 1 day) and a purchase category (e.g., a baby crib). As such, the aggregated attributes 325 may be defined based on data stored in the data platform 305 and may be used by the communication process flow management service 310 to configure and execute a communication process flow.

In some cases, the communication process flow management service 310 may manage configurable activities and features for a communication process flow, such as the actions 220 described with reference to FIG. 2. In addition, a user of the tenant may configure the activities and features for the communication process flow and using the communication process flow management service 310 based on data stored in the data platform 305, such as attribute data associated with the segments 320 or a schema of the data model of the data platform 305.

The communication process flow management service 310 may manage a schedule 330, an audience entry 335, an event entry 340, a decision split 345, a wait until event 350, a message 355, and exit criteria 360, among other activities or features associated with the communication process flow. The schedule 330 may identify a set of times at which the communication process flow management service 310 may request updated attribute data or an updated schema of the data model from the data platform 305. For example, the schedule 330 may be configured to cause the communication process flow management service 310 to transmit a request according to a period (e.g., daily at 9 am), or the schedule 330 may trigger the communication process flow management service 310 to transmit the request at a particular time before executing an activity such as the decision split 345 or a wait until event 350 such that those activities may use recent data.

The communication process flow management service 310 may use the audience entry 335 as an entry source for the communication process flow (e.g., a segment of entities of the segments 320, a CDP segment 1). For example, the communication process flow management service 310 may receive an indication of the segment 320 from the data platform 305, and a user may select the audience entry 335 at the beginning of the communication process flow based on the segment 320. Put another way, the audience entry 335 may identify from where customers entering the communication process flow came. The audience entry 335 may be associated with one or more attributes, and the attributes may change at different points of the communication process flow, thus causing the communication process flow management service 310 to request updated attribute data from the data platform 305 according to the schedule 330.

The event entry 340 may be an action that prompts one or more entities of the segments 320 to enter the communication process flow. In some examples, the event entry 340 may be associated with customer behavior and actions, including the aggregated attributes 325 of the data platform 305. In the example of FIG. 3, the event entry 340 may correspond to a customer making a purchase (e.g., a purchase of a baby crib associated with the aggregated attributes 325, a CDP action 1). Alternatively, the event entry 340 may correspond to a customer installing an application, adding items to a cart, and the like. Entities associated with the event entry 340 may enter the communication process flow.

In some examples, a user may use the communication process flow management service 310 to configure the decision split 345. As described with reference to FIG. 2, the decision split 345 may use attribute data associated with the segments 320 to route entities of the segments 320 via a path of the communication process flow based on a user-defined filter criteria. If an entity satisfies more than one set of criteria for multiple paths, the entity may be routed via the path the entity satisfies criteria for first. In addition, the decision split 345 may be configured based on the aggregated attributes 325 defined in the data platform 305. For example, the decision split 345 may be based on a customer reviewing a product. If the customer leaves a two star or three star review, the customer may be routed via a first path of the communication process flow (e.g., Path 1). If the customer leaves a four star or a five star review, the customer may be routed via a second path of the communication process flow (e.g., Path 2).

Additionally, or alternatively, a user may use the communication process flow management service 310 to configure the wait until event 350. The wait until event 350 may manage the timing with which the communication process flow management service 310 may transmit a set of communications to one or more entities of the segments 320. For example, based on requesting a schema of the data model from the data platform 305, the communication process flow management service 310 may receive the schema of the data model, which may include information from the unified profiles 315, the aggregated attributes 325, or both stored in the data platform 305. Based on the schema of the data model, the communication process flow management service 310 may determine an expression for routing an entity of the segments 320 via a path of the communication process flow. The expression may include the wait until event 350 (e.g., a duration of time before the entity is to be routed via the path). The wait until event 350 may be configured based on a customer behavior, such as the filter criteria for the decision split 345 being met. In the example of FIG. 3, an entity may have to wait before being routed via the path of the communication process flow based on how long it takes a customer to review a product after purchasing the product (e.g., a review action, where ReviewDate <=PurchaseDate).

Users may configure the message 355 in the communication process flow management service 310, where the message 355 may be included in a set of communications to be transmitted to one or more entities of the segment 320. In some examples, the message 355 may be configured using the unified profiles 315 and other customer data stored in the data platform 305. For example, the message 355 may be an email that addresses each entity by their first name as defined in the audience entry 335 (e.g., %% audience.firstname %%) or updated attribute data requested and received as some point along the communication process flow. In some examples, the message 355 may differ based on which path entities are routed via based on the decision split 345 or other activities of the communication process flow.

The exit criteria 360 may indicate when entities included in the audience entry 335 (e.g., customers that entered the communication process flow) may exit from the communication process flow. In some examples, the exit criteria 360 may be based on the attribute data associated with the segments 320 and the aggregated attributes 325, the data included in the unified profiles 315, or a combination thereof. For example, a user (e.g., customer) may be exited or released from the communication process flow if the customer reviews a product after purchasing the product and if the review is one star (e.g., ReviewDate <=PurchaseDate) and (review=1 star). Accordingly, the communication process flow management service 310 may use attribute data, the schema of the data model, or both from the data platform 305 to configure the communication process flow and enter, route, and exit users through the communication process flow efficiently.

Figure 4:
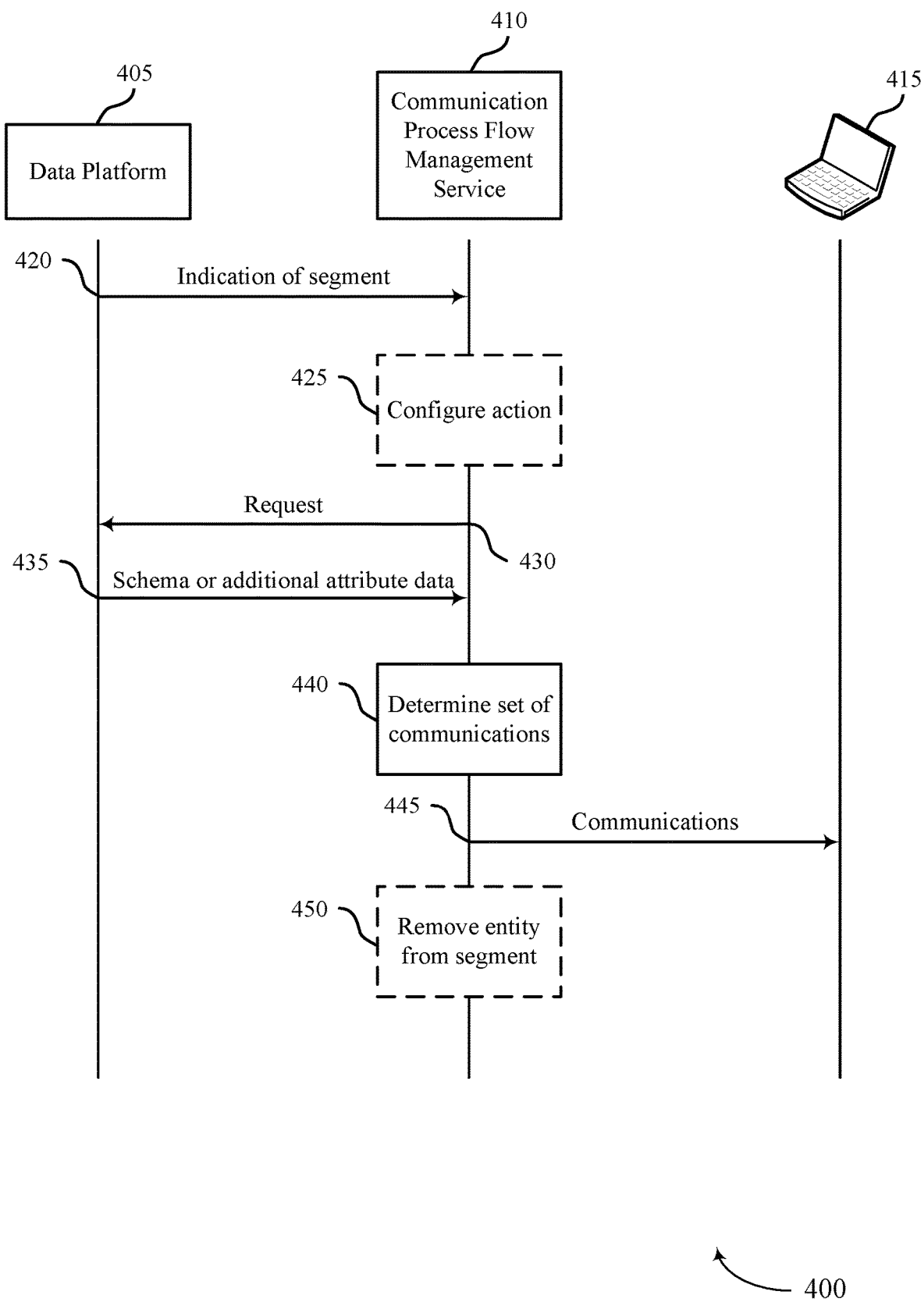
FIG. 4 illustrates an example of a process flow that supports techniques for communication process flow and data platform integration in accordance with aspects of the present disclosure.

FIG. 4 illustrates an example of a process flow 400 that supports techniques for communication process flow and data platform integration in accordance with aspects of the present disclosure. The process flow 400 may implement or be implemented by aspects of the data processing system 100 or the computing architecture 200. For example, the process flow 400 may include a data platform 405, a communication process flow management service 410, and a user device 415 that corresponds to an entity, which may be examples of corresponding services and platforms described with reference FIGS. 1 through 3. In the following description of the process flow 400, operations between the data platform 405, the communication process flow management service 410, and the user device 415 may be performed in a different order or at a different time than as shown. Additionally, or alternatively, some operations may be omitted from the process flow 400, and other operations may be added to the process flow 400. The process flow 400 may support techniques for improved integration between the data platform 405 and the communication process flow management service 410.

At 420, the communication process flow management service 410 may receive, from the data platform 405 that manages a data model for a set of multiple entities, an indication of a segment of entities of the set of multiple entities. The segment of entities may be associated with one or more attributes and configured to receive a set of multiple communications in accordance with a communication process flow managed by the communication process flow management service 410. The one or more attributes may include age, name, gender, purchase history, and the like.

At 425, the communication process flow management service 410 may configure an action of the communication process flow. The action may include a decision split, a wait until event activity, or another action that may be included in the communication process flow. The action may be configured by a user of the communication process flow management service 410 using a user interface.

At 430, the communication process flow management service 410 may transmit, to the data platform 405 and based on the action of the communication process flow, a request for a schema of the data model or for additional attribute data associated with the segment of entities. For example, if the action is a decision split, the communication process flow management service 410 may request the schema of the data model from the data platform 405 to identify attributes for defining filter criteria for the decision split. In some examples, the request may identify one or more fields associated with the additional attribute data.

At 435, the communication process flow management service 410 may receive, from the data platform 405 and based on transmitting the request, the schema of the data model or the additional attribute data. In some examples, the communication process flow management service 410 may receive the one or more fields identified in the request in associated with the additional attribute data.

At 440, the communication process flow management service 410 may determine a set of communications to be transmitted to one or more entities of the segment of entities based on the schema of the data model or the additional attribute data received from the data platform 405. In some examples, the set of communications may include one or more emails, messages, or other electronic communications. In addition, the set of communications may differ for different entities based on how the entities are routed through the communication process flow (e.g., based on a decision split or other action defined in the communication process flow).

At 445, the communication process flow management service 410 may transmit the set of communications to the user device 415 associated with an entity of one or more entities in accordance with the communication process flow. For example, the communication process flow management service 410 may transmit an email to one or more entities that are associated with an attribute that indicates that the one or more entities are associated with purchasing a product.

At 450, the communication process flow management service 410 may remove the entity from the segment of entities in association with the communication process flow based on an exit criteria being satisfied by the additional attribute data. For example, based on the additional attribute data received from the data platform 405, the communication process flow management service 410 may determine that an exit criteria defined by the communication process flow is satisfied by the additional attribute data that is associated with an entity of the segment of entities and received in response to the request. The exit criteria may be triggered by an action of the entity. For example, the entity may be removed from the segment if the entity leaves a particular review of a purchased product.

Figure 5:
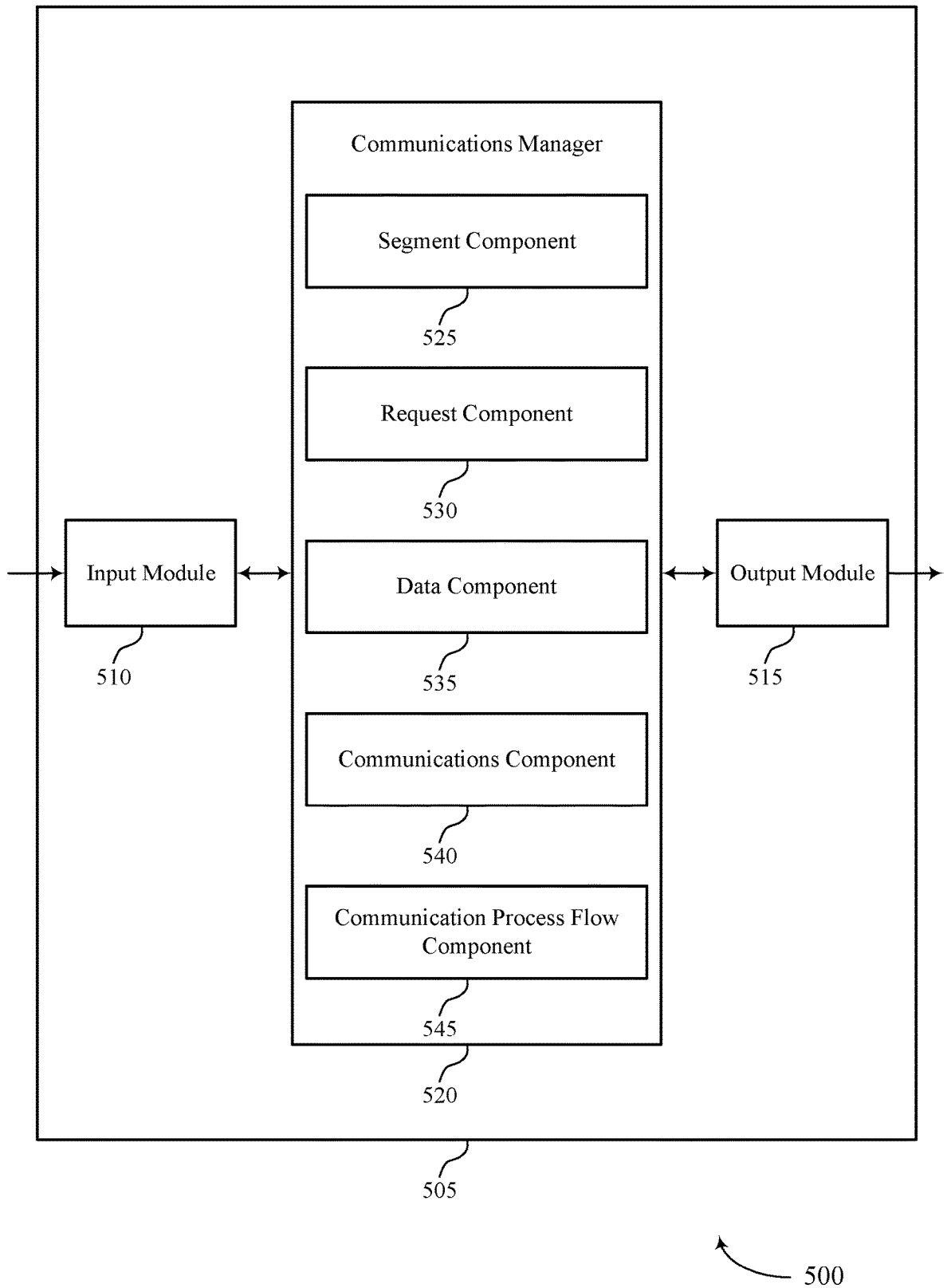
FIG. 5 shows a block diagram of an apparatus that supports techniques for communication process flow and data platform integration in accordance with aspects of the present disclosure.

FIG. 5 shows a block diagram 500 of a device 505 that supports techniques for communication process flow and data platform integration in accordance with aspects of the present disclosure. The device 505 may include an input module 510, an output module 515, and a communications manager 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the communications manager 520 to support techniques for communication process flow and data platform integration. In some cases, the input module 510 may be a component of an I/O controller 710 as described with reference to FIG. 7.

The output module 515 may manage output signals for the device 505. For example, the output module 515 may receive signals from other components of the device 505, such as the communications manager 520, and may transmit these signals to other components or devices. In some examples, the output module 515 may transmit output signals for display in a user interface, for storage in a database or data store, for further processing at a server or server cluster, or for any other processes at any quantity of devices or systems. In some cases, the output module 515 may be a component of an I/O controller 710 as described with reference to FIG. 7.

For example, the communications manager 520 may include a segment component 525, a request component 530, a data component 535, a communications component 540, a communication process flow component 545, or any combination thereof. In some examples, the communications manager 520, or various components thereof, may be configured to perform various operations (e.g., receiving, monitoring, transmitting) using or otherwise in cooperation with the input module 510, the output module 515, or both. For example, the communications manager 520 may receive information from the input module 510, send information to the output module 515, or be integrated in combination with the input module 510, the output module 515, or both to receive information, transmit information, or perform various other operations as described herein.

The communications manager 520 may support data processing in accordance with examples as disclosed herein. The segment component 525 may be configured as or otherwise support a means for receiving, at a communication process flow management service and from a second service that manages a data model for a set of multiple entities, an indication of a segment of entities of the set of multiple entities, the segment of entities being associated with one or more attributes and configured to receive a set of multiple communications in accordance with a communication process flow managed by the communication process flow management service. The request component 530 may be configured as or otherwise support a means for transmitting, to the second service and based on an action of the communication process flow, a request for a schema of the data model or for additional attribute data associated with the segment of entities. The data component 535 may be configured as or otherwise support a means for receiving, from the second service and based on the request, the schema of the data model or the additional attribute data. The communications component 540 may be configured as or otherwise support a means for determining, based on the schema of the data model or the additional attribute data received from the second service, a set of communications to be transmitted to one or more entities of the segment of entities. The communication process flow component 545 may be configured as or otherwise support a means for transmitting the set of communications to the one or more entities in accordance with the communication process flow.

Figure 6:
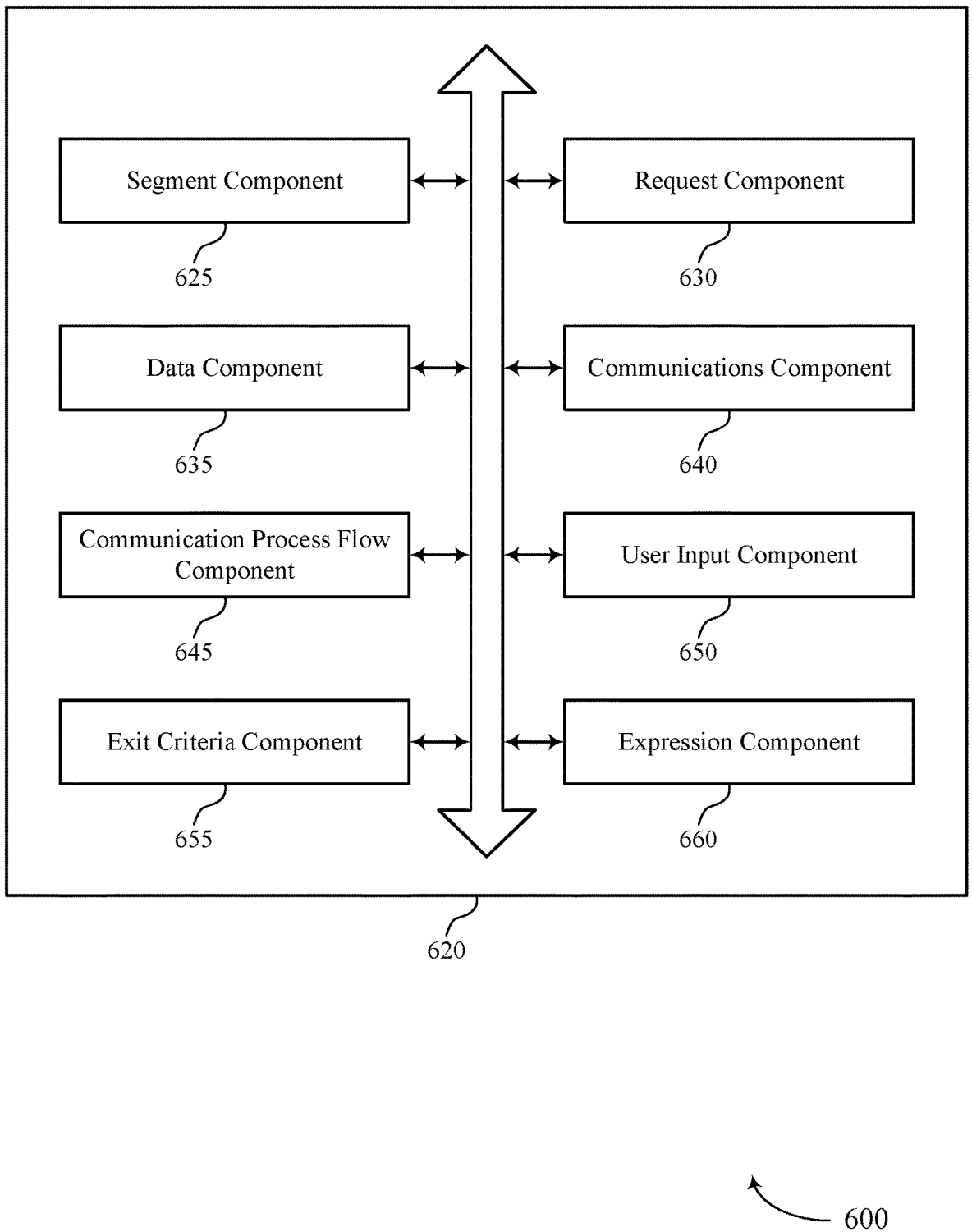
FIG. 6 shows a block diagram of a communications manager that supports techniques for communication process flow and data platform integration in accordance with aspects of the present disclosure.

FIG. 6 shows a block diagram 600 of a communications manager 620 that supports techniques for communication process flow and data platform integration in accordance with aspects of the present disclosure. The communications manager 620 may be an example of aspects of a communications manager or a communications manager 520, or both, as described herein. The communications manager 620, or various components thereof, may be an example of means for performing various aspects of techniques for communication process flow and data platform integration as described herein. For example, the communications manager 620 may include a segment component 625, a request component 630, a data component 635, a communications component 640, a communication process flow component 645, a user input component 650, an exit criteria component 655, an expression component 660, or any combination thereof. Each of these components may communicate, directly or indirectly, with one another (e.g., via one or more buses).

The communications manager 620 may support data processing in accordance with examples as disclosed herein. The segment component 625 may be configured as or otherwise support a means for receiving, at a communication process flow management service and from a second service that manages a data model for a set of multiple entities, an indication of a segment of entities of the set of multiple entities, the segment of entities being associated with one or more attributes and configured to receive a set of multiple communications in accordance with a communication process flow managed by the communication process flow management service. The request component 630 may be configured as or otherwise support a means for transmitting, to the second service and based on an action of the communication process flow, a request for a schema of the data model or for additional attribute data associated with the segment of entities. The data component 635 may be configured as or otherwise support a means for receiving, from the second service and based on the request, the schema of the data model or the additional attribute data. The communications component 640 may be configured as or otherwise support a means for determining, based on the schema of the data model or the additional attribute data received from the second service, a set of communications to be transmitted to one or more entities of the segment of entities. The communication process flow component 645 may be configured as or otherwise support a means for transmitting the set of communications to the one or more entities in accordance with the communication process flow.

In some examples, to support transmitting the request, the request component 630 may be configured as or otherwise support a means for transmitting the request for the additional attribute data associated with the segment of entities based on executing the action of the communication process flow.

In some examples, the user input component 650 may be configured as or otherwise support a means for receiving an input from a user of the communication process flow management service to configure the action of the communication process flow. In some examples, the request component 630 may be configured as or otherwise support a means for transmitting, to the second service and based on receiving the input, the request for the schema of the data model.

In some examples, the data component 635 may be configured as or otherwise support a means for receiving, from the second service and based on the request, the schema of the data model. In some examples, the expression component 660 may be configured as or otherwise support a means for determining an expression for routing an entity via a path of the communication process flow based on receiving the schema of the data model. In some examples, the expression includes a duration of time before an entity is to be routed via the path based at least on the schema of the data model or the additional attribute data.

In some examples, the request component 630 may be configured as or otherwise support a means for transmitting, to the second service and based on the action of the communication process flow, a second request for updated additional attribute data associated with the segment of entities. In some examples, the data component 635 may be configured as or otherwise support a means for receiving, from the second service and based on the second request, the updated additional attribute data.

In some examples, to support transmitting the request, the request component 630 may be configured as or otherwise support a means for transmitting, to the second service and based on the action of the communication process flow, the request for the additional attribute data associated with the segment of entities, where the request identifies one or more fields associated with the additional attribute data.

In some examples, to support determining the set of communications, the communications component 640 may be configured as or otherwise support a means for routing an entity via a path of the communication process flow based on attribute data associated with the entity and stored in the data model, where one or more actions of the communication process flow on the path define the set of communications.

In some examples, the exit criteria component 655 may be configured as or otherwise support a means for determining, based on the additional attribute data received from the second service, that an exit criteria defined by the communication process flow is satisfied by the additional attribute data that is associated with an entity of the segment of entities and received in response to the request. In some examples, the exit criteria component 655 may be configured as or otherwise support a means for removing the entity from the segment in association with the communication process flow based on the exit criteria being satisfied by the additional attribute data. In some examples, the communication process flow management service operates on a first cloud platform and the second service operates on a second cloud platform.

Figure 7:
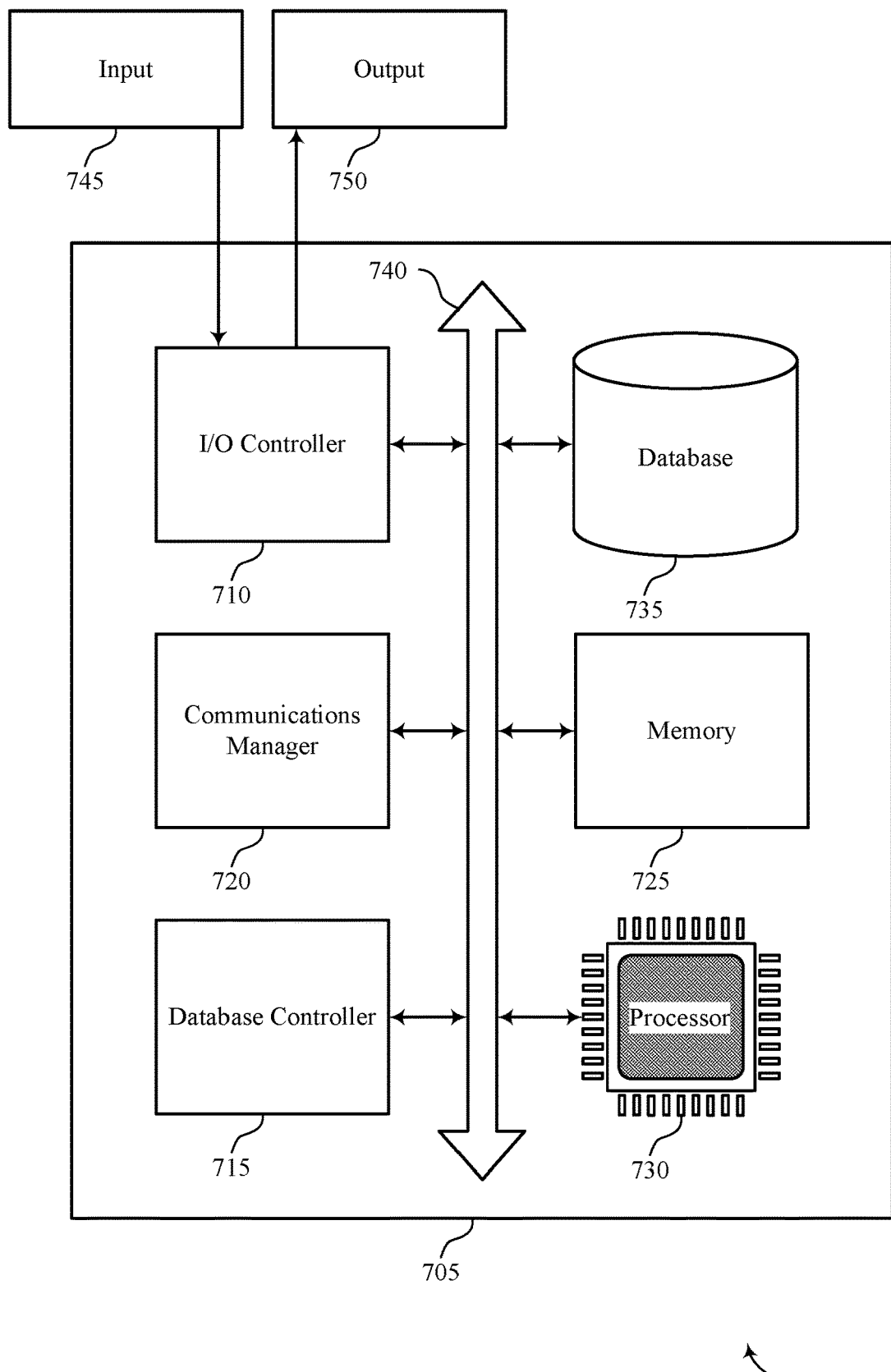
FIG. 7 shows a diagram of a system including a device that supports techniques for communication process flow and data platform integration in accordance with aspects of the present disclosure.

FIG. 7 shows a diagram of a system 700 including a device 705 that supports techniques for communication process flow and data platform integration in accordance with aspects of the present disclosure. The device 705 may be an example of or include the components of a device 505 as described herein. The device 705 may include components for bi-directional data communications including components for transmitting and receiving communications, such as a communications manager 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and ROM. The memory 725 may store computer-readable, computer-executable software including instructions that, when executed, cause the processor 730 to perform various functions described herein. In some cases, the memory 725 may contain, among other things, a BIOS which may control basic hardware or software operation such as the interaction with peripheral components or devices.

The processor 730 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting techniques for communication process flow and data platform integration).

The communications manager 720 may support data processing in accordance with examples as disclosed herein. For example, the communications manager 720 may be configured as or otherwise support a means for receiving, at a communication process flow management service and from a second service that manages a data model for a set of multiple entities, an indication of a segment of entities of the set of multiple entities, the segment of entities being associated with one or more attributes and configured to receive a set of multiple communications in accordance with a communication process flow managed by the communication process flow management service. The communications manager 720 may be configured as or otherwise support a means for transmitting, to the second service and based on an action of the communication process flow, a request for a schema of the data model or for additional attribute data associated with the segment of entities. The communications manager 720 may be configured as or otherwise support a means for receiving, from the second service and based on the request, the schema of the data model or the additional attribute data. The communications manager 720 may be configured as or otherwise support a means for determining, based on the schema of the data model or the additional attribute data received from the second service, a set of communications to be transmitted to one or more entities of the segment of entities. The communications manager 720 may be configured as or otherwise support a means for transmitting the set of communications to the one or more entities in accordance with the communication process flow.

By including or configuring the communications manager 720 in accordance with examples as described herein, the device 705 may support techniques for integrating a data platform (e.g., CDP) and a communication process flow management service, which may provide for two-way, real-time communications such that the communication process flow management service may use updated information to configure a communication process flow. As such, the described techniques may improve workflow efficiencies, increase efficiency and accuracy of communication process flows, and improve user satisfaction.

Figure 8:
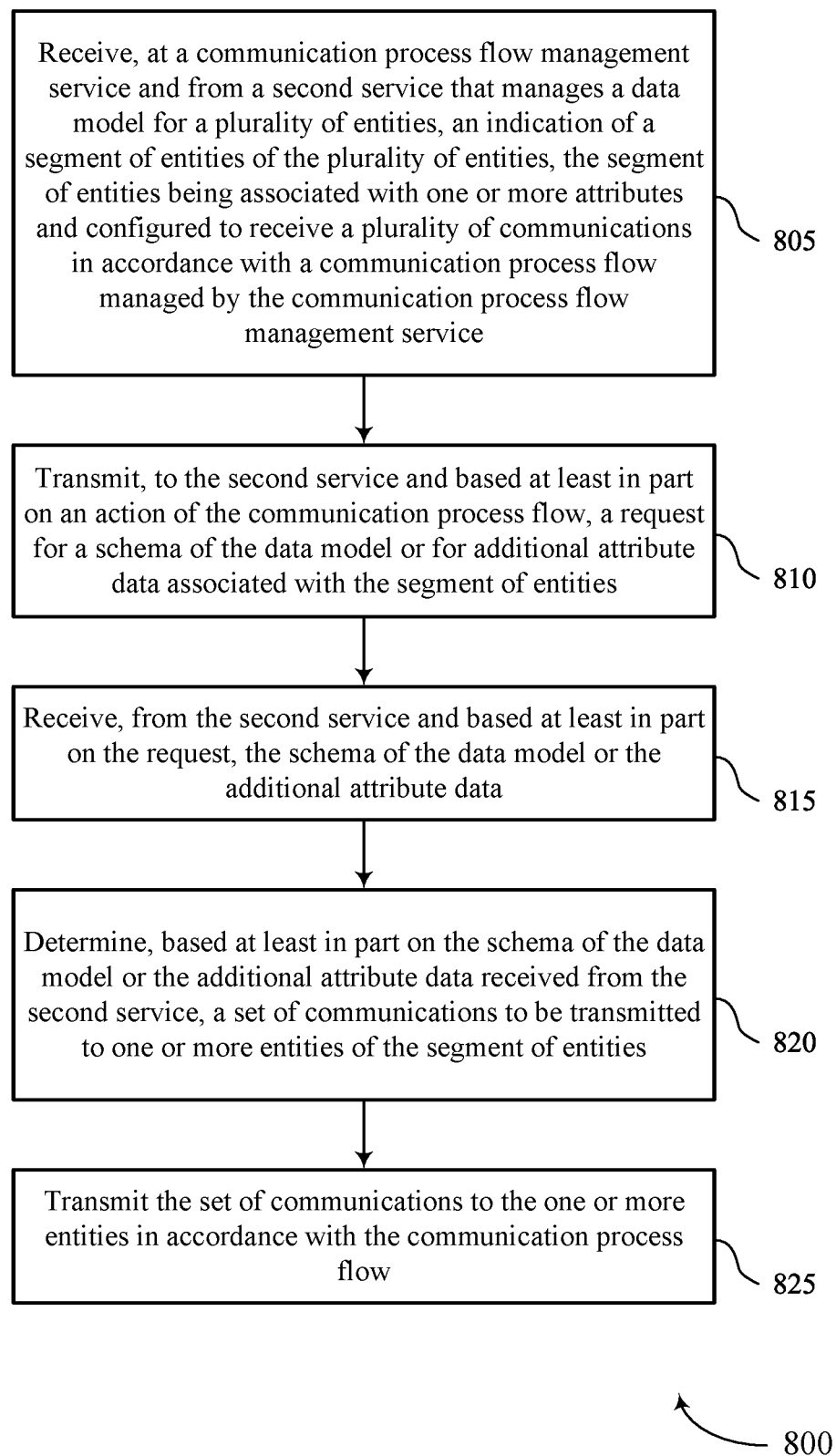
FIGS. 8 through 11 show flowcharts illustrating methods that support techniques for communication process flow and data platform integration in accordance with aspects of the present disclosure.

FIG. 8 shows a flowchart illustrating a method 800 that supports techniques for communication process flow and data platform integration in accordance with aspects of the present disclosure. The operations of the method 800 may be implemented by a communications manager or its components as described herein. For example, the operations of the method 800 may be performed by a communications manager as described with reference to FIGS. 1 through 7. In some examples, a communications manager may execute a set of instructions to control the functional elements of the communications manager to perform the described functions. Additionally, or alternatively, the communications manager may perform aspects of the described functions using special-purpose hardware.

At 805, the method may include receiving, at a communication process flow management service and from a second service that manages a data model for a set of multiple entities, an indication of a segment of entities of the set of multiple entities, the segment of entities being associated with one or more attributes and configured to receive a set of multiple communications in accordance with a communication process flow managed by the communication process flow management service. The operations of 805 may be performed in accordance with examples as disclosed herein. In some examples, aspects of the operations of 805 may be performed by a segment component 625 as described with reference to FIG. 6.

At 810, the method may include transmitting, to the second service and based on an action of the communication process flow, a request for a schema of the data model or for additional attribute data associated with the segment of entities. The operations of 810 may be performed in accordance with examples as disclosed herein. In some examples, aspects of the operations of 810 may be performed by a request component 630 as described with reference to FIG. 6.

At 815, the method may include receiving, from the second service and based on the request, the schema of the data model or the additional attribute data. The operations of 815 may be performed in accordance with examples as disclosed herein. In some examples, aspects of the operations of 815 may be performed by a data component 635 as described with reference to FIG. 6.

At 820, the method may include determining, based on the schema of the data model or the additional attribute data received from the second service, a set of communications to be transmitted to one or more entities of the segment of entities. The operations of 820 may be performed in accordance with examples as disclosed herein. In some examples, aspects of the operations of 820 may be performed by a communications component 640 as described with reference to FIG. 6.

At 825, the method may include transmitting the set of communications to the one or more entities in accordance with the communication process flow. The operations of 825 may be performed in accordance with examples as disclosed herein. In some examples, aspects of the operations of 825 may be performed by a communication process flow component 645 as described with reference to FIG. 6.

Figure 9:
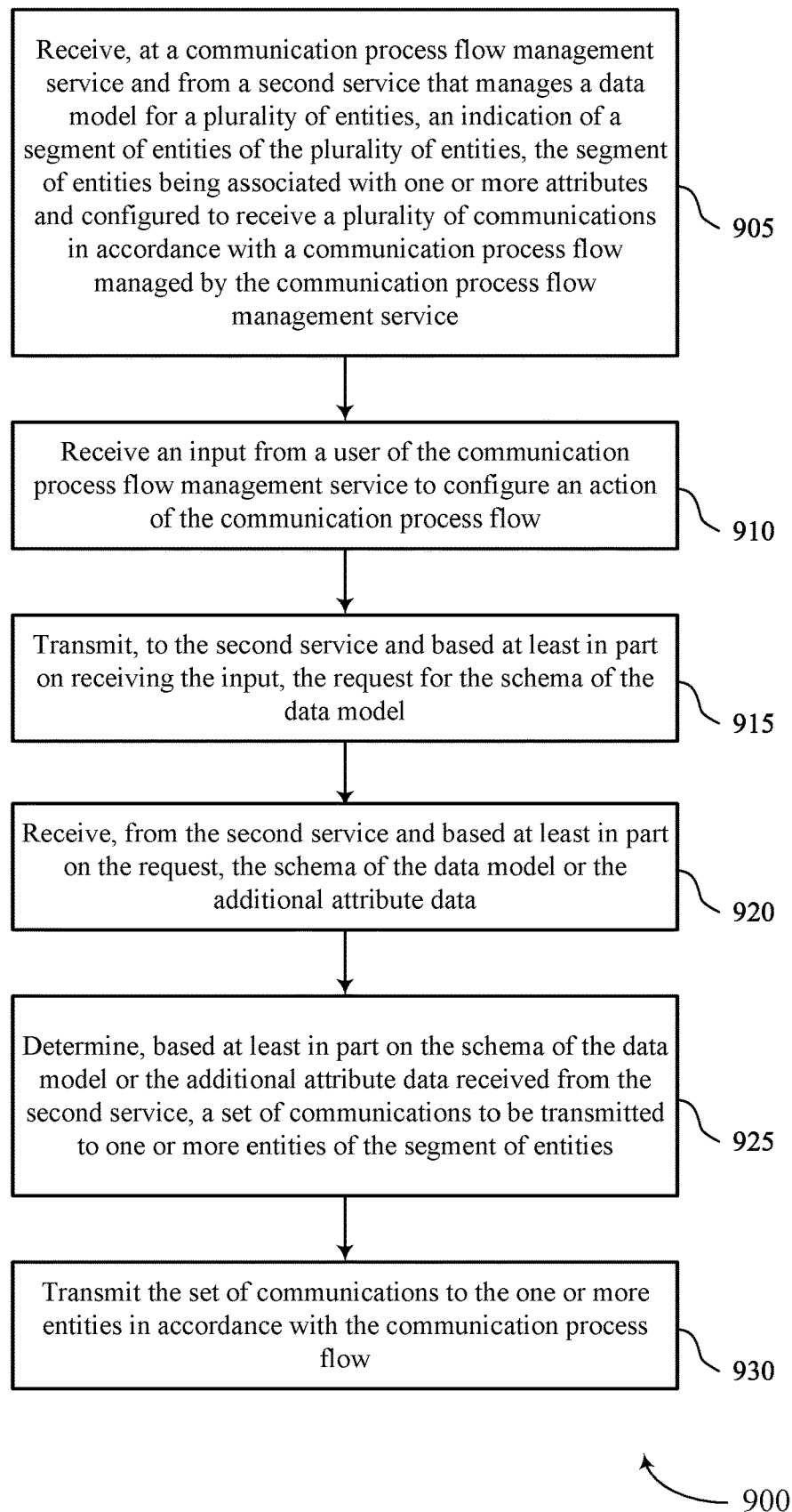

FIG. 9 shows a flowchart illustrating a method 900 that supports techniques for communication process flow and data platform integration in accordance with aspects of the present disclosure. The operations of the method 900 may be implemented by a communications manager or its components as described herein. For example, the operations of the method 900 may be performed by a communications manager as described with reference to FIGS. 1 through 7. In some examples, a communications manager may execute a set of instructions to control the functional elements of the communications manager to perform the described functions. Additionally, or alternatively, the communications manager may perform aspects of the described functions using special-purpose hardware.

At 905, the method may include receiving, at a communication process flow management service and from a second service that manages a data model for a set of multiple entities, an indication of a segment of entities of the set of multiple entities, the segment of entities being associated with one or more attributes and configured to receive a set of multiple communications in accordance with a communication process flow managed by the communication process flow management service. The operations of 905 may be performed in accordance with examples as disclosed herein. In some examples, aspects of the operations of 905 may be performed by a segment component 625 as described with reference to FIG. 6.

At 910, the method may include receiving an input from a user of the communication process flow management service to configure an action of the communication process flow. The operations of 910 may be performed in accordance with examples as disclosed herein. In some examples, aspects of the operations of 910 may be performed by a user input component 650 as described with reference to FIG. 6.

At 915, the method may include transmitting, to the second service and based on receiving the input, the request for the schema of the data model. The operations of 915 may be performed in accordance with examples as disclosed herein. In some examples, aspects of the operations of 915 may be performed by a request component 630 as described with reference to FIG. 6.

At 920, the method may include receiving, from the second service and based on the request, the schema of the data model or the additional attribute data. The operations of 920 may be performed in accordance with examples as disclosed herein. In some examples, aspects of the operations of 920 may be performed by a data component 635 as described with reference to FIG. 6.

At 925, the method may include determining, based on the schema of the data model or the additional attribute data received from the second service, a set of communications to be transmitted to one or more entities of the segment of entities. The operations of 925 may be performed in accordance with examples as disclosed herein. In some examples, aspects of the operations of 925 may be performed by a communications component 640 as described with reference to FIG. 6.

At 930, the method may include transmitting the set of communications to the one or more entities in accordance with the communication process flow. The operations of 930 may be performed in accordance with examples as disclosed herein. In some examples, aspects of the operations of 930 may be performed by a communication process flow component 645 as described with reference to FIG. 6.

Figure 10:
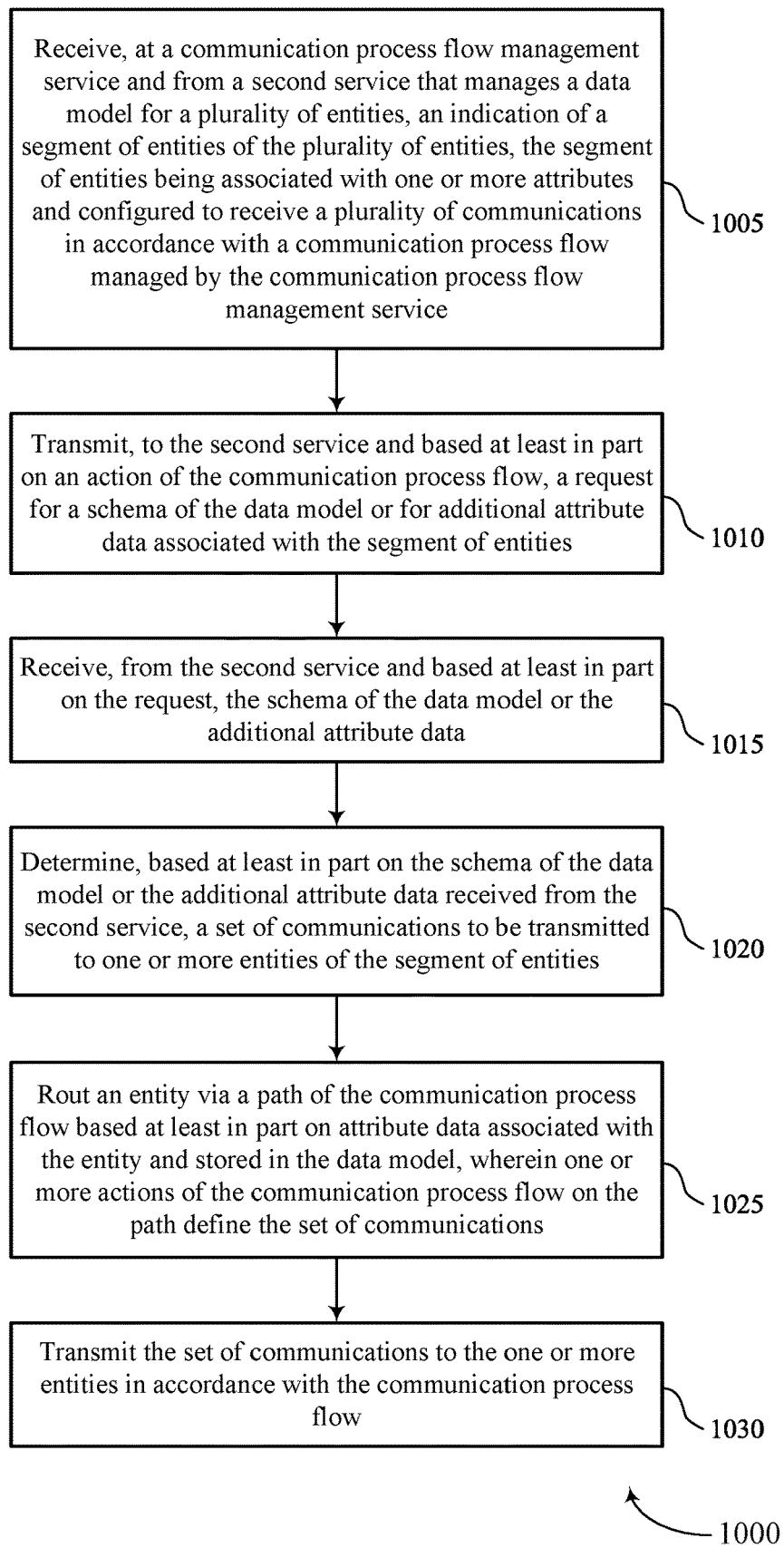

FIG. 10 shows a flowchart illustrating a method 1000 that supports techniques for communication process flow and data platform integration in accordance with aspects of the present disclosure. The operations of the method 1000 may be implemented by a communications manager or its components as described herein. For example, the operations of the method 1000 may be performed by a communications manager as described with reference to FIGS. 1 through 7. In some examples, a communications manager may execute a set of instructions to control the functional elements of the communications manager to perform the described functions. Additionally, or alternatively, the communications manager may perform aspects of the described functions using special-purpose hardware.

At 1005, the method may include receiving, at a communication process flow management service and from a second service that manages a data model for a set of multiple entities, an indication of a segment of entities of the set of multiple entities, the segment of entities being associated with one or more attributes and configured to receive a set of multiple communications in accordance with a communication process flow managed by the communication process flow management service. The operations of 1005 may be performed in accordance with examples as disclosed herein. In some examples, aspects of the operations of 1005 may be performed by a segment component 625 as described with reference to FIG. 6.

At 1010, the method may include transmitting, to the second service and based on an action of the communication process flow, a request for a schema of the data model or for additional attribute data associated with the segment of entities. The operations of 1010 may be performed in accordance with examples as disclosed herein. In some examples, aspects of the operations of 1010 may be performed by a request component 630 as described with reference to FIG. 6.

At 1015, the method may include receiving, from the second service and based on the request, the schema of the data model or the additional attribute data. The operations of 1015 may be performed in accordance with examples as disclosed herein. In some examples, aspects of the operations of 1015 may be performed by a data component 635 as described with reference to FIG. 6.

At 1020, the method may include determining, based on the schema of the data model or the additional attribute data received from the second service, a set of communications to be transmitted to one or more entities of the segment of entities. The operations of 1020 may be performed in accordance with examples as disclosed herein. In some examples, aspects of the operations of 1020 may be performed by a communications component 640 as described with reference to FIG. 6.

At 1025, the method may include routing an entity via a path of the communication process flow based on attribute data associated with the entity and stored in the data model, where one or more actions of the communication process flow on the path define the set of communications. The operations of 1025 may be performed in accordance with examples as disclosed herein. In some examples, aspects of the operations of 1025 may be performed by a communications component 640 as described with reference to FIG. 6.

At 1030, the method may include transmitting the set of communications to the one or more entities in accordance with the communication process flow. The operations of 1030 may be performed in accordance with examples as disclosed herein. In some examples, aspects of the operations of 1030 may be performed by a communication process flow component 645 as described with reference to FIG. 6.

Figure 11:
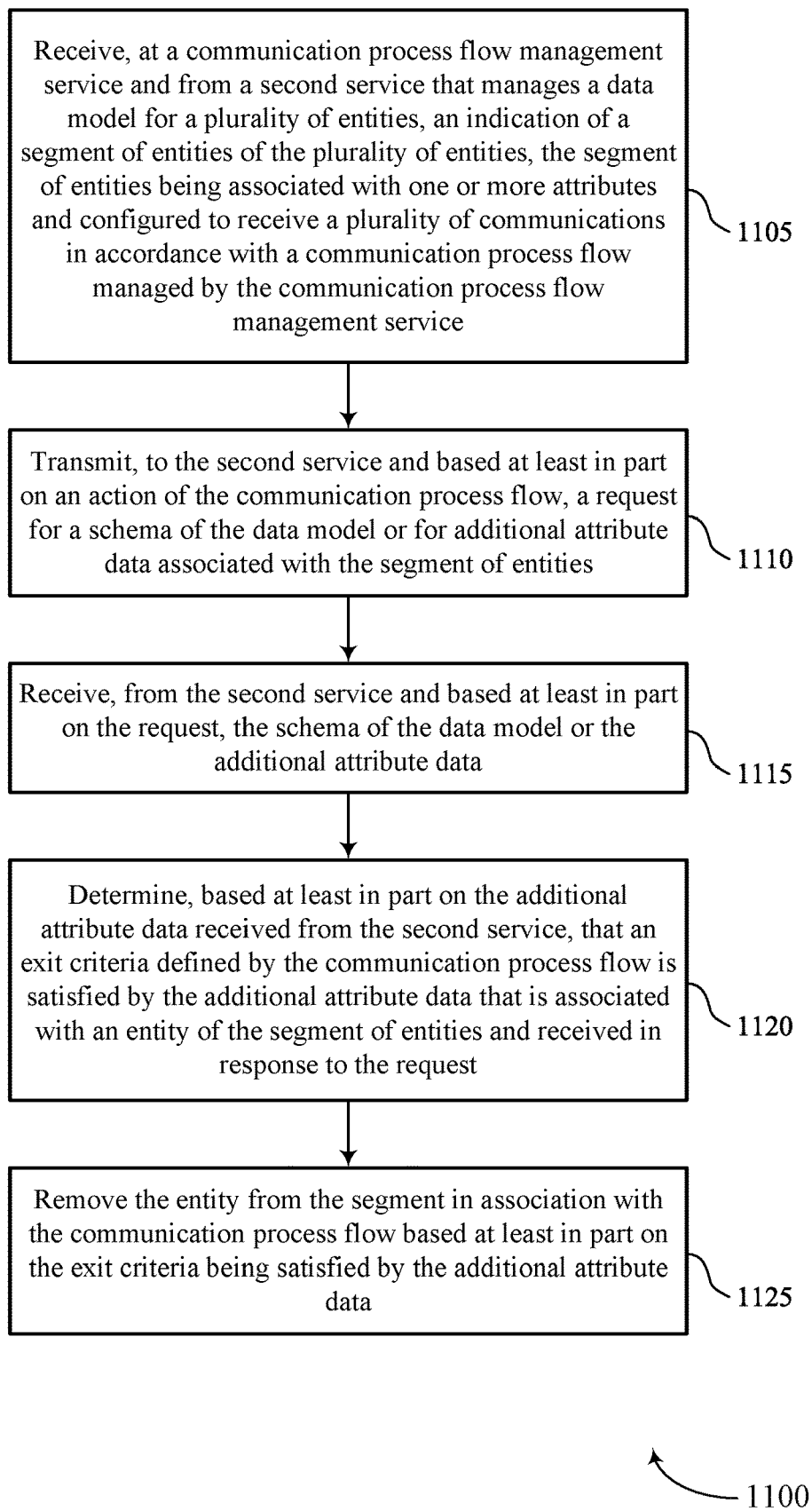

FIG. 11 shows a flowchart illustrating a method 1100 that supports techniques for communication process flow and data platform integration in accordance with aspects of the present disclosure. The operations of the method 1100 may be implemented by a communications manager or its components as described herein. For example, the operations of the method 1100 may be performed by a communications manager as described with reference to FIGS. 1 through 7. In some examples, a communications manager may execute a set of instructions to control the functional elements of the communications manager to perform the described functions. Additionally, or alternatively, the communications manager may perform aspects of the described functions using special-purpose hardware.

At 1105, the method may include receiving, at a communication process flow management service and from a second service that manages a data model for a set of multiple entities, an indication of a segment of entities of the set of multiple entities, the segment of entities being associated with one or more attributes and configured to receive a set of multiple communications in accordance with a communication process flow managed by the communication process flow management service. The operations of 1105 may be performed in accordance with examples as disclosed herein. In some examples, aspects of the operations of 1105 may be performed by a segment component 625 as described with reference to FIG. 6.

At 1110, the method may include transmitting, to the second service and based on an action of the communication process flow, a request for a schema of the data model or for additional attribute data associated with the segment of entities. The operations of 1110 may be performed in accordance with examples as disclosed herein. In some examples, aspects of the operations of 1110 may be performed by a request component 630 as described with reference to FIG. 6.

At 1115, the method may include receiving, from the second service and based on the request, the schema of the data model or the additional attribute data. The operations of 1115 may be performed in accordance with examples as disclosed herein. In some examples, aspects of the operations of 1115 may be performed by a data component 635 as described with reference to FIG. 6.

At 1120, the method may include determining, based on the additional attribute data received from the second service, that an exit criteria defined by the communication process flow is satisfied by the additional attribute data that is associated with an entity of the segment of entities and received in response to the request. The operations of 1120 may be performed in accordance with examples as disclosed herein. In some examples, aspects of the operations of 1120 may be performed by an exit criteria component 655 as described with reference to FIG. 6.

At 1125, the method may include removing the entity from the segment in association with the communication process flow based on the exit criteria being satisfied by the additional attribute data. The operations of 1125 may be performed in accordance with examples as disclosed herein. In some examples, aspects of the operations of 1125 may be performed by an exit criteria component 655 as described with reference to FIG. 6.

A method for data processing is described. The method may include receiving, at a communication process flow management service and from a second service that manages a data model for a set of multiple entities, an indication of a segment of entities of the set of multiple entities, the segment of entities being associated with one or more attributes and configured to receive a set of multiple communications in accordance with a communication process flow managed by the communication process flow management service, transmitting, to the second service and based on an action of the communication process flow, a request for a schema of the data model or for additional attribute data associated with the segment of entities, receiving, from the second service and based on the request, the schema of the data model or the additional attribute data, determining, based on the schema of the data model or the additional attribute data received from the second service, a set of communications to be transmitted to one or more entities of the segment of entities, and transmitting the set of communications to the one or more entities in accordance with the communication process flow.

An apparatus for data processing is described. The apparatus may include a processor, memory coupled with the processor, and instructions stored in the memory. The instructions may be executable by the processor to cause the apparatus to receive, at a communication process flow management service and from a second service that manages a data model for a set of multiple entities, an indication of a segment of entities of the set of multiple entities, the segment of entities being associated with one or more attributes and configured to receive a set of multiple communications in accordance with a communication process flow managed by the communication process flow management service, transmit, to the second service and based on an action of the communication process flow, a request for a schema of the data model or for additional attribute data associated with the segment of entities, receive, from the second service and based on the request, the schema of the data model or the additional attribute data, determine, based on the schema of the data model or the additional attribute data received from the second service, a set of communications to be transmitted to one or more entities of the segment of entities, and transmit the set of communications to the one or more entities in accordance with the communication process flow.

Another apparatus for data processing is described. The apparatus may include means for receiving, at a communication process flow management service and from a second service that manages a data model for a set of multiple entities, an indication of a segment of entities of the set of multiple entities, the segment of entities being associated with one or more attributes and configured to receive a set of multiple communications in accordance with a communication process flow managed by the communication process flow management service, means for transmitting, to the second service and based on an action of the communication process flow, a request for a schema of the data model or for additional attribute data associated with the segment of entities, means for receiving, from the second service and based on the request, the schema of the data model or the additional attribute data, means for determining, based on the schema of the data model or the additional attribute data received from the second service, a set of communications to be transmitted to one or more entities of the segment of entities, and means for transmitting the set of communications to the one or more entities in accordance with the communication process flow.

A non-transitory computer-readable medium storing code for data processing is described. The code may include instructions executable by a processor to receive, at a communication process flow management service and from a second service that manages a data model for a set of multiple entities, an indication of a segment of entities of the set of multiple entities, the segment of entities being associated with one or more attributes and configured to receive a set of multiple communications in accordance with a communication process flow managed by the communication process flow management service, transmit, to the second service and based on an action of the communication process flow, a request for a schema of the data model or for additional attribute data associated with the segment of entities, receive, from the second service and based on the request, the schema of the data model or the additional attribute data, determine, based on the schema of the data model or the additional attribute data received from the second service, a set of communications to be transmitted to one or more entities of the segment of entities, and transmit the set of communications to the one or more entities in accordance with the communication process flow.

In some examples of the method, apparatuses, and non-transitory computer-readable medium described herein, transmitting the request may include operations, features, means, or instructions for transmitting the request for the additional attribute data associated with the segment of entities based on executing the action of the communication process flow.

Some examples of the method, apparatuses, and non-transitory computer-readable medium described herein may further include operations, features, means, or instructions for receiving an input from a user of the communication process flow management service to configure the action of the communication process flow and transmitting, to the second service and based on receiving the input, the request for the schema of the data model.

Some examples of the method, apparatuses, and non-transitory computer-readable medium described herein may further include operations, features, means, or instructions for receiving, from the second service and based on the request, the schema of the data model and determining an expression for routing an entity via a path of the communication process flow based on receiving the schema of the data model.

In some examples of the method, apparatuses, and non-transitory computer-readable medium described herein, the expression includes a duration of time before an entity may be routed via the path based at least on the schema of the data model or the additional attribute data.

Some examples of the method, apparatuses, and non-transitory computer-readable medium described herein may further include operations, features, means, or instructions for transmitting, to the second service and based on the action of the communication process flow, a second request for updated additional attribute data associated with the segment of entities and receiving, from the second service and based on the second request, the updated additional attribute data.

In some examples of the method, apparatuses, and non-transitory computer-readable medium described herein, transmitting the request may include operations, features, means, or instructions for transmitting, to the second service and based on the action of the communication process flow, the request for the additional attribute data associated with the segment of entities, where the request identifies one or more fields associated with the additional attribute data.

In some examples of the method, apparatuses, and non-transitory computer-readable medium described herein, determining the set of communications may include operations, features, means, or instructions for routing an entity via a path of the communication process flow based on attribute data associated with the entity and stored in the data model, where one or more actions of the communication process flow on the path define the set of communications.

Some examples of the method, apparatuses, and non-transitory computer-readable medium described herein may further include operations, features, means, or instructions for determining, based on the additional attribute data received from the second service, that an exit criteria defined by the communication process flow may be satisfied by the additional attribute data that may be associated with an entity of the segment of entities and received in response to the request and removing the entity from the segment in association with the communication process flow based on the exit criteria being satisfied by the additional attribute data.

In some examples of the method, apparatuses, and non-transitory computer-readable medium described herein, the communication process flow management service operates on a first cloud platform and the second service operates on a second cloud platform.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   receiving, at a communication process flow management service and from a second service that manages a data model for a plurality of entities, an indication of a segment of entities of the plurality of entities, the segment of entities being associated with one or more attributes and configured to receive a plurality of communications in accordance with a communication process flow managed by the communication process flow management service;
   transmitting, to the second service and based at least in part on an action of the communication process flow, a request for information of the data model;
   receiving, from the second service and based at least in part on the request, the information of the data model;
   determining, based at least in part on the information of the data model received from the second service, that an exit criteria defined by the communication process flow is satisfied by data that is associated with an entity of the segment of entities;
   removing the entity from the segment of entities in association with the communication process flow based at least in part on the exit criteria being satisfied by the information of the data model;
   determining, based at least in part on the information of the data model received from the second service, a set of communications to be transmitted to one or more entities of the segment of entities; and
   transmitting the set of communications to the one or more entities in accordance with the communication process flow.

2. The method of claim 1, wherein transmitting the request comprises:
   transmitting the request for the information of the data model comprising additional attribute data associated with the segment of entities based at least in part on executing the action of the communication process flow.

3. The method of claim 1, further comprising:
   receiving an input from a user of the communication process flow management service to configure the action of the communication process flow; and
   transmitting, to the second service and based at least in part on receiving the input, the request for the information of the data model comprising schema of the data model.

4. The method of claim 3, further comprising:
   receiving, from the second service and based at least in part on the request, the schema of the data model; and
   determining an expression for routing an entity via a path of the communication process flow based at least in part on receiving the schema of the data model.

5. The method of claim 4, wherein the expression comprises a duration of time before an entity is to be routed via the path based at least on the information of the data model.

6. The method of claim 1, further comprising:
   transmitting, to the second service and based at least in part on the action of the communication process flow, a second request for updated additional attribute data associated with the segment of entities; and
   receiving, from the second service and based at least in part on the second request, the updated additional attribute data.

7. The method of claim 1, wherein transmitting the request comprises:

transmitting, to the second service and based at least in part on the action of the communication process flow, the request for the information of the data model comprising additional attribute data associated with the segment of entities, wherein the request identifies one or more fields associated with the additional attribute data.

8. The method of claim 1, wherein determining the set of communications comprises:
routing an entity via a path of the communication process flow based at least in part on attribute data associated with the entity and stored in the data model, wherein one or more actions of the communication process flow on the path define the set of communications.

9. The method of claim 1, wherein the communication process flow management service operates on a first cloud platform and the second service operates on a second cloud platform.

10. The method of claim 1, wherein the plurality of entities comprise a plurality of users.

11. An apparatus for data processing, comprising:
a processor;
memory coupled with the processor; and
instructions stored in the memory and executable by the processor to cause the apparatus to:
receive, at a communication process flow management service and from a second service that manages a data model for a plurality of entities, an indication of a segment of entities of the plurality of entities, the segment of entities being associated with one or more attributes and configured to receive a plurality of communications in accordance with a communication process flow managed by the communication process flow management service;
transmit, to the second service and based at least in part on an action of the communication process flow, a request for information of the data model;
receive, from the second service and based at least in part on the request, the information of the data model;
determine, based at least in part on the information of the data model received from the second service, that an exit criteria defined by the communication process flow is satisfied by data that is associated with an entity of the segment of entities;
remove the entity from the segment of entities in association with the communication process flow based at least in part on the exit criteria being satisfied by the information of the data model;
determine, based at least in part on the information of the data model received from the second service, a set of communications to be transmitted to one or more entities of the segment of entities; and
transmit the set of communications to the one or more entities in accordance with the communication process flow.

12. The apparatus of claim 11, wherein the instructions to transmit the request are executable by the processor to cause the apparatus to:
transmit the request for the information of the data model comprising additional attribute data associated with the segment of entities based at least in part on executing the action of the communication process flow.

13. The apparatus of claim 11, wherein the instructions are further executable by the processor to cause the apparatus to:

receive an input from a user of the communication process flow management service to configure the action of the communication process flow; and
transmit, to the second service and based at least in part on receiving the input, the request for the information of the data model comprising schema of the data model.

14. The apparatus of claim 13, wherein the instructions are further executable by the processor to cause the apparatus to:
receive, from the second service and based at least in part on the request, the schema of the data model; and
determine an expression for routing an entity via a path of the communication process flow based at least in part on receiving the schema of the data model.

15. The apparatus of claim 14, wherein the expression comprises a duration of time before an entity is to be routed via the path based at least on the information of the data model.

16. The apparatus of claim 11, wherein the instructions are further executable by the processor to cause the apparatus to:
transmit, to the second service and based at least in part on the action of the communication process flow, a second request for updated additional attribute data associated with the segment of entities; and
receive, from the second service and based at least in part on the second request, the updated additional attribute data.

17. The apparatus of claim 11, wherein the instructions to transmit the request are executable by the processor to cause the apparatus to:
transmit, to the second service and based at least in part on the action of the communication process flow, the request for the information of the data model comprising additional attribute data associated with the segment of entities, wherein the request identifies one or more fields associated with the additional attribute data.

18. The apparatus of claim 11, wherein the instructions to determine the set of communications are executable by the processor to cause the apparatus to:
rout an entity via a path of the communication process flow based at least in part on attribute data associated with the entity and stored in the data model, wherein one or more actions of the communication process flow on the path define the set of communications.

19. A non-transitory computer-readable medium storing code for data processing, the code comprising instructions executable by a processor to:
receive, at a communication process flow management service and from a second service that manages a data model for a plurality of entities, an indication of a segment of entities of the plurality of entities, the segment of entities being associated with one or more attributes and configured to receive a plurality of communications in accordance with a communication process flow managed by the communication process flow management service;
transmit, to the second service and based at least in part on an action of the communication process flow, a request for information of the data model;
receive, from the second service and based at least in part on the request, the information of the data model;
determine, based at least in part on the information of the data model received from the second service, that an exit criteria defined by the communication process flow is satisfied by data that is associated with an entity of the segment of entities;

remove the entity from the segment of entities in association with the communication process flow based at least in part on the exit criteria being satisfied by the information of the data model;

determine, based at least in part on the information of the data model received from the second service, a set of communications to be transmitted to one or more entities of the segment of entities; and transmit the set of communications to the one or more entities in accordance with the communication process flow.

20. The apparatus of claim 11, wherein the plurality of entities comprise a plurality of users.

* * * * *